United States Patent
Steenstrup et al.

(10) Patent No.: US 12,306,296 B2
(45) Date of Patent: *May 20, 2025

(54) ACOUSTIC DOPPLER SYSTEM AND METHOD

(71) Applicant: R3VOX LTD, Birkirkara (MT)

(72) Inventors: Jens Steenstrup, B'Kara (MT); Christopher Tiemann, Austin, TX (US); Mark Chun, Austin, TX (US); Kirk Hobart, Austin, TX (US)

(73) Assignee: R3VOX LTD (MT)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,234

(22) Filed: Nov. 6, 2023

(65) Prior Publication Data
US 2024/0069193 A1 Feb. 29, 2024

Related U.S. Application Data

(63) Continuation of application No. 17/671,717, filed on Feb. 15, 2022, now Pat. No. 11,846,704, which is a continuation of application No. 16/844,609, filed on Apr. 9, 2020, now Pat. No. 11,280,903, which is a continuation-in-part of application No. 16/693,248, filed on Nov. 23, 2019, now Pat. No. 11,119,211, which is a continuation of application No. 15/807,406, filed on Nov. 8, 2017, now Pat. No. 10,571,565, which is a continuation of application No. 15/495,802, filed on Apr. 24, 2017, now Pat. No. 9,817,116, which is a continuation-in-part of application No. 15/476,137, filed on Mar. 31, 2017, now Pat. No. 10,132,924.

(60) Provisional application No. 62/329,631, filed on Apr. 29, 2016, provisional application No. 62/423,055, filed on Nov. 16, 2016.

(51) Int. Cl.
G01S 15/58 (2006.01)
G01S 7/282 (2006.01)
G01S 15/60 (2006.01)

(52) U.S. Cl.
CPC ............ *G01S 15/582* (2013.01); *G01S 7/282* (2013.01); *G01S 15/60* (2013.01)

(58) Field of Classification Search
CPC ........ G01S 15/582; G01S 7/282; G01S 15/60; G01S 15/102
See application file for complete search history.

(56) References Cited

U.S. PATENT DOCUMENTS

| | | | |
|---|---|---|---|
| 3,144,631 A | 8/1964 | Lustig et al. | |
| 5,483,499 A | 1/1996 | Brumley et al. | |
| 7,092,440 B1 | 8/2006 | Dress, Jr. et al. | |
| 8,305,841 B2 | 11/2012 | Riordan et al. | |
| 9,244,168 B2 | 1/2016 | Proctor | |
| 9,817,116 B1 * | 11/2017 | Steenstrup | G01S 15/60 |
| 10,571,565 B2 * | 2/2020 | Steenstrup | G01S 15/582 |

(Continued)

FOREIGN PATENT DOCUMENTS

WO WO-2017189740 A1 * 11/2017 ........... G01S 15/582

*Primary Examiner* — Daniel Pihulic
(74) *Attorney, Agent, or Firm* — Paul D. Chance; Ocean Law

(57) ABSTRACT

A survey system including a multibeam echo sounder having a projector array and a hydrophone array uses a multi-component message to ensonify one or more fans to estimate a Doppler velocity.

18 Claims, 23 Drawing Sheets

(56) References Cited

U.S. PATENT DOCUMENTS

| | | | |
|---|---|---|---|
| 11,119,211 B2* | 9/2021 | Steenstrup | G01S 15/582 |
| 11,280,903 B2* | 3/2022 | Steenstrup | G01S 15/582 |
| 11,846,704 B2* | 12/2023 | Steenstrup | G01S 15/102 |
| 2014/0230567 A1 | 8/2014 | Rowe et al. | |
| 2017/0315234 A1* | 11/2017 | Steenstrup | G01S 7/282 |
| 2018/0067208 A1* | 3/2018 | Steenstrup | G01S 15/582 |
| 2020/0110174 A1* | 4/2020 | Steenstrup | G01S 15/60 |
| 2020/0256986 A1* | 8/2020 | Steenstrup | G01S 7/282 |
| 2022/0187452 A1* | 6/2022 | Steenstrup | G01S 15/102 |
| 2024/0069193 A1* | 2/2024 | Steenstrup | G01S 7/282 |

\* cited by examiner

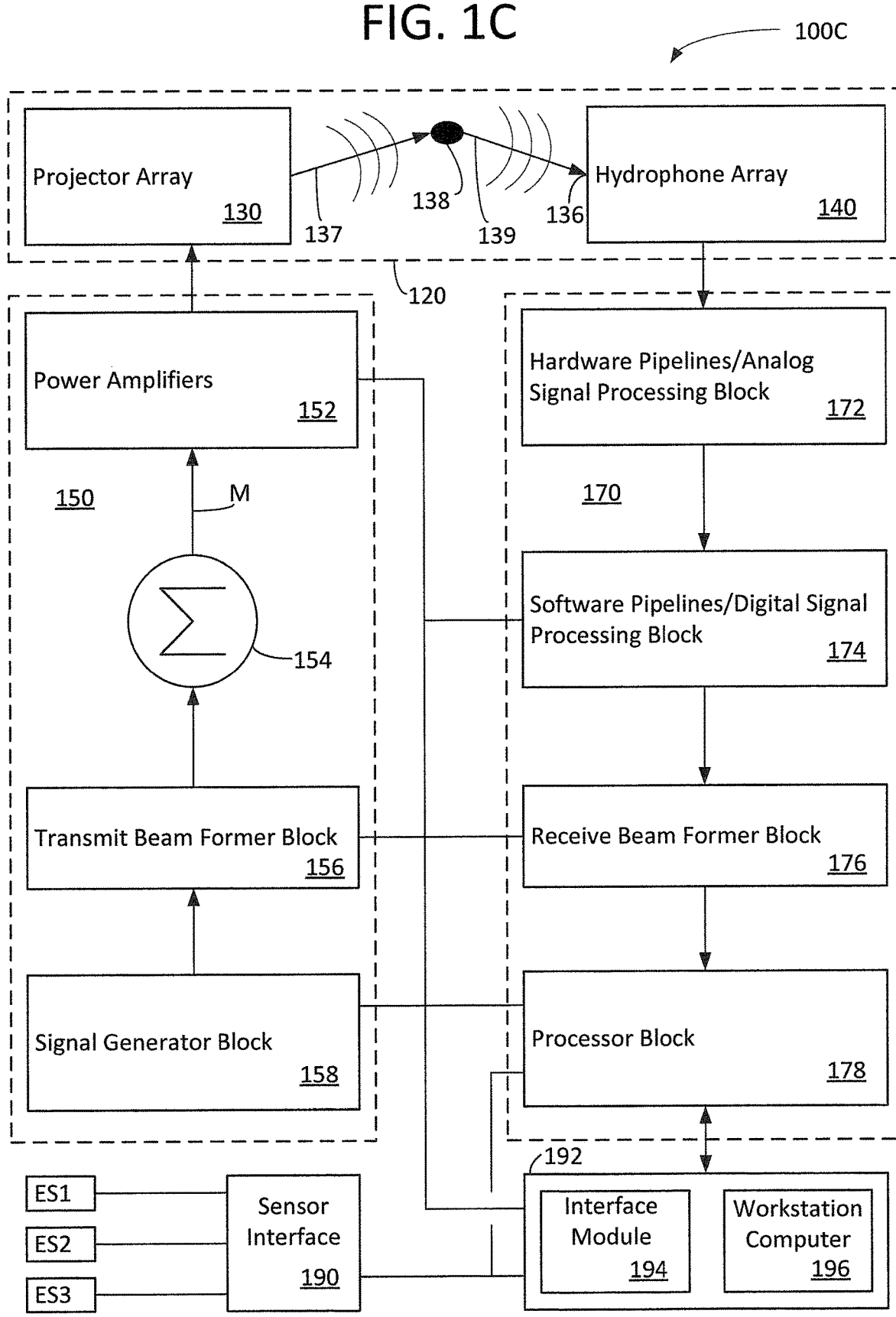

| SYMBOL | DESCRIPTION |
|---|---|
| AD | Analog to digital converter |
| BF | Beamformer |
| ESx | External Sensor x |
| PA | Power amplifier |
| PRO | Processor |
| SG | Signal generator |
| ▽ | Amplifier |
| ⊼ | Antialiasing filter |
| ⋀ | Band pass filter |
| ↓ | Decimator |
| ⊗ (x) | Mixer |

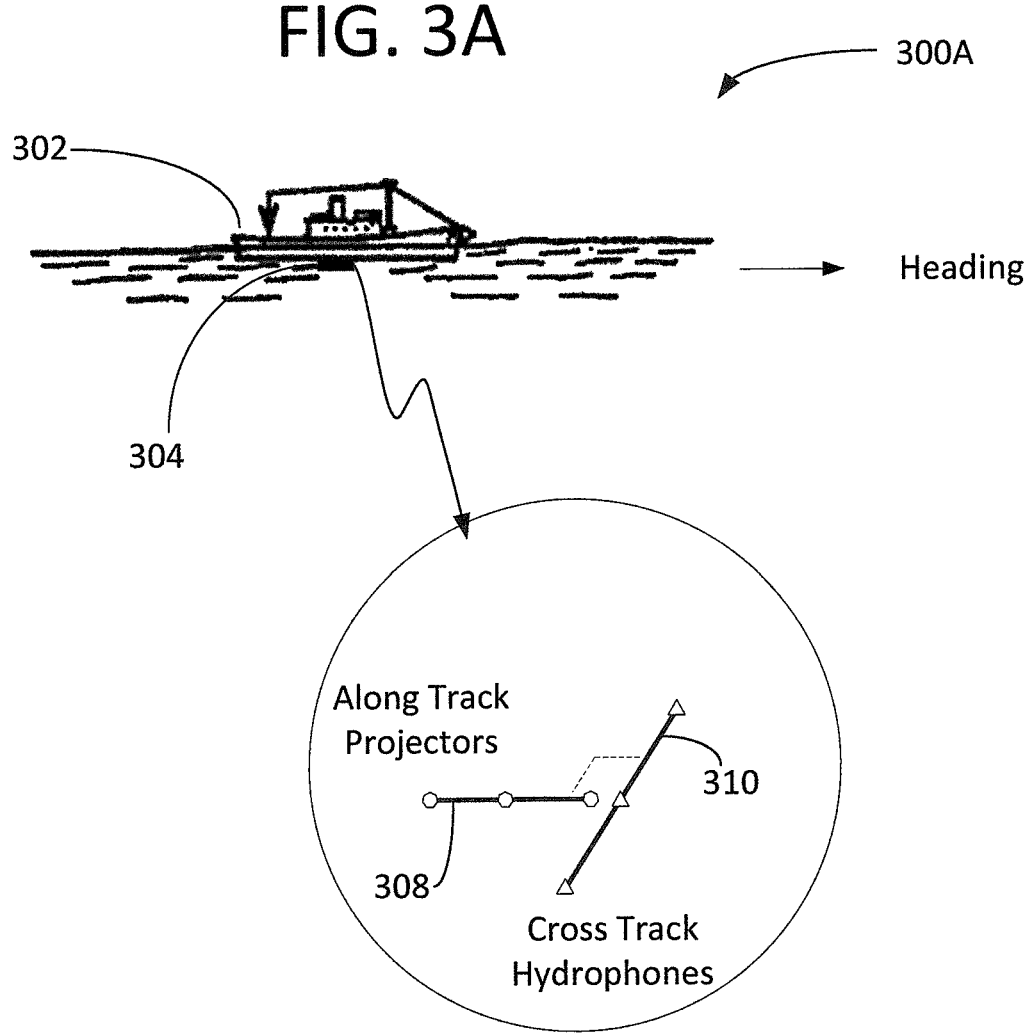

FIG. 4G

400G $$DRV_{i,j} = CSANGLE_{i,j} * (c / (2 * pi * f_c * T))$$

where  $CSANGLE_{i,j}$ = autocorrelation angle
$f_c$ = center frequency of transmitted pulse (Hz)
T = pulse length
c = speed of sound (m/s)

FIG. 4H

400H $$Cost = \sum_{i=1}^{fans} \sum_{j=1}^{beams} (kx1 * V_{source} * D - DRV_{i,j})^2$$

where  $D = Cos(YA - BA_j) * Cos(PA - FA_i)$
kx1 = 2 for DVL mode
kx1 = 1 for ADCP mode
$V_{source}$ = Relative velocity between MBES and reflector

| Knowns | Unknowns |
|---|---|
| $DRV_{i,j}$ | Vsource |
| $BA_j$ | YA |
| $FA_i$ | PA |

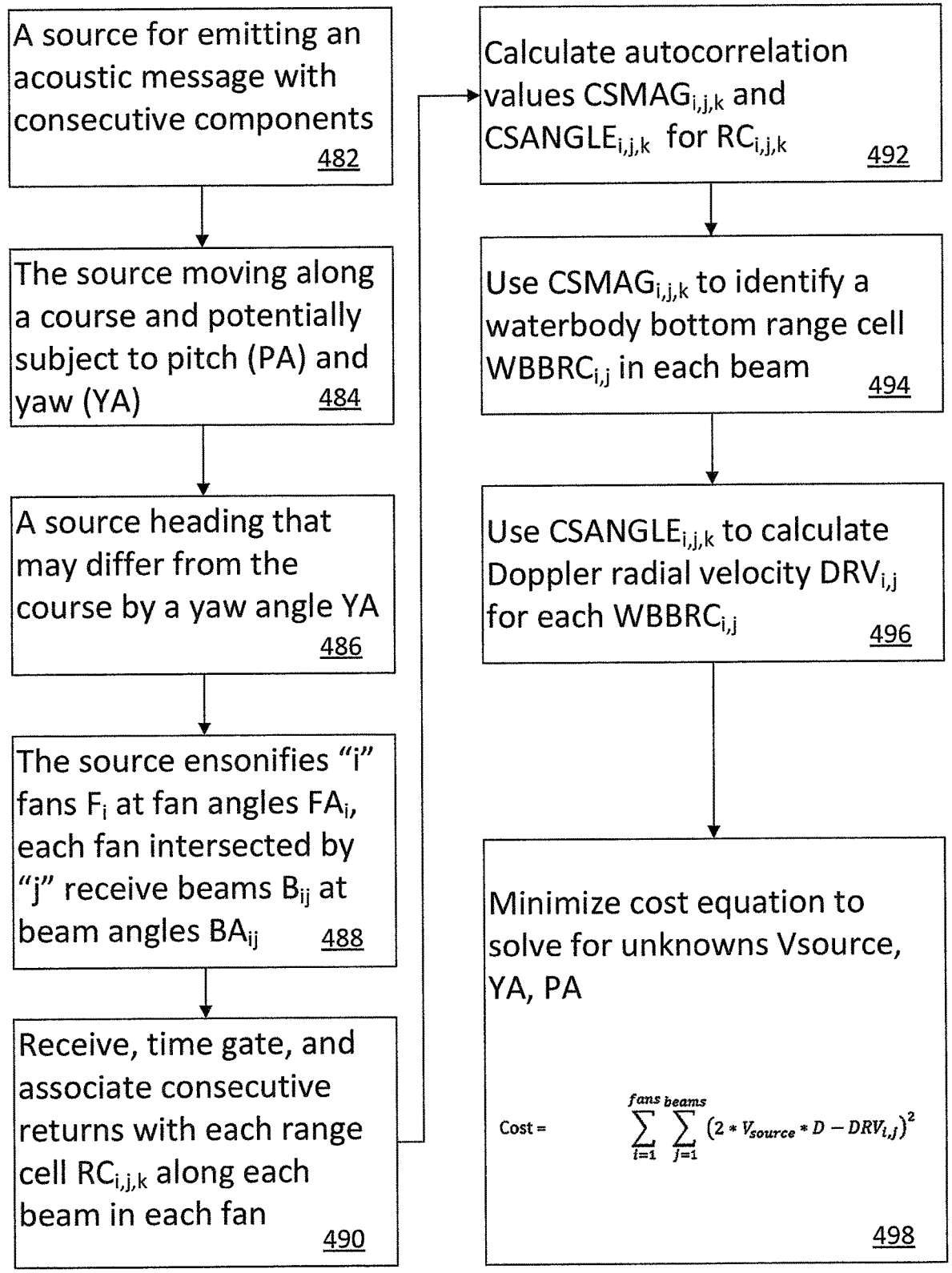

FAN 1

|  | Short Pulse Pair | | Long Pulse Pair | | Frequency Band |
|---|---|---|---|---|---|
|  | Message Code 1 | Message Code 1 | Message Code 2 | Message Code 2 | |
| Construct 1 | Barker Code 11 | Barker Code 11 | Barker Code 12 | Barker Code 12 | A |
| Construct 2 | OSS Code 11 | OSS Code 11 | OSS Code 12 | OSS Code 12 | A |

FAN 2

|  | Short Pulse Pair | | Long Pulse Pair | | Frequency Band |
|---|---|---|---|---|---|
|  | Message Code 1 | Message Code 1 | Message Code 2 | Message Code 2 | |
| Construct 1 | Barker Code 21 | Barker Code 21 | Barker Code 22 | Barker Code 22 | B |
| Construct 2 | OSS Code 21 | OSS Code 21 | OSS Code 22 | OSS Code 22 | B |

FAN 3

|  | Short Pulse Pair | | Long Pulse Pair | | Frequency Band |
|---|---|---|---|---|---|
|  | Message Code 1 | Message Code 1 | Message Code 2 | Message Code 2 | |
| Construct 1 | Barker Code 31 | Barker Code 31 | Barker Code 32 | Barker Code 32 | C |
| Construct 2 | OSS Code 31 | OSS Code 31 | OSS Code 32 | OSS Code 32 | C |

ACOUSTIC DOPPLER SYSTEM AND METHOD

PRIORITY APPLICATION AND INCORPORATION BY REFERENCE

This application is a continuation of U.S. patent application Ser. No. 17/671,717 filed Feb. 15, 2022 which is a continuation of U.S. patent application Ser. No. 16/844,609 filed Apr. 9, 2020 which is a continuation-in-part of U.S. patent application Ser. No. 16/693,248 filed Nov. 23, 2019 which is a continuation of U.S. patent application Ser. No. 15/807,406 filed Nov. 8, 2017 now U.S. Pat. No. 10,571,565 which is a continuation of U.S. patent application Ser. No. 15/495,802 filed Apr. 24, 2017 now U.S. Pat. No. 9,817,116 which is a continuation-in-part of U.S. patent application Ser. No. 15/476,137 filed Mar. 31, 2017 now U.S. Pat. No. 10,132,924 which claims the benefit of U.S. Prov. Pat. App. No. 62/329,631 filed Apr. 29, 2016 and this application claims the benefit of 62/423,055 filed Nov. 16, 2016 all of which are included herein by reference, in their entirety and for all purposes. This application incorporates by reference, in their entireties and for all purposes, the disclosures of U.S. Pat. No. 3,144,631 concerning Mills Cross sonar, U.S. Pat. No. 5,483,499 concerning Doppler frequency estimation, U.S. Pat. No. 7,092,440 concerning spread spectrum communications techniques, U.S. Pat. No. 8,305,841 concerning sonar used for mapping seafloor topography, and U.S. Pat. No. 9,244,168 concerning frequency burst sonar.

BACKGROUND OF THE INVENTION

Field of the Invention

The present invention relates to underwater acoustical systems, methods for using underwater acoustical systems, and methods for processing and using the data they produce. In particular, the invention relates to survey systems including sonar systems capable of making Doppler measurements such as Doppler velocities associated with multifan ensonification of fixed or moving targets.

Discussion of the Related Art

A month after the Titanic struck an iceberg in 1912, English meteorologist Lewis Richardson filed a patent at the British Patent Office for an underwater ranging device. Modern day successors to Richardson's invention are often referred to as SONAR (sound navigation and ranging) devices.

Modern day SONAR devices include ones capable of making Doppler measurements to determine velocities. Where there is relative motion between a target and a SONAR that ensonifies the target, echoes from the target may be used to determine relative target velocities. For example, where a SONAR moves relative to a fixed target, echoes from the target may be used to determine SONAR velocities.

Such Doppler velocity measurements are subject to multiple sources of error. Such errors limit the utility of an otherwise useful survey and navigation aid technology.

SUMMARY OF THE INVENTION

The present invention provides a multifan survey system and method. Multifan survey operations may be useful in multiple survey tasks including bathymetry, water column monitoring, forward look survey, Doppler velocimetry, Doppler current profiling, and motion stabilization.

Doppler velocimetry may benefit from multifan operation with advantages including use of one or more of forward/backward steered beams that allow for a Janus-like configuration of beams from a multi-beam echo sounder. Doppler estimates like Doppler velocity log ("DVL") estimates may be made. Doppler estimates like Acoustic Doppler Current Profiling ("ADCP") estimates may be made.

As disclosed herein, an array of projectors transmits a beam that ensonifies reflectors, and an array of hydrophones receives echoes from these reflectors. The projected beampattern may be fan-shaped as it travels to reflectors in a zone or area of ensonification. This zone or area of ensonification may be an elongated pattern and may be referred to as a fan or swath. Echoes returned from this zone are processed to provide survey results.

In an embodiment, an acoustic Doppler sonar system for estimating relative velocities comprising: plural transducers in a single projector array provide an acoustic source; a transmitter for exciting the projector array; the excited projector array for ensonifying reflectors in each of multiple underwater fans; plural transducers in a single hydrophone array for sensing backscattered returns from the reflectors; a receiver for processing the backscattered returns; the arrays configured with respect to each other such that multiple hydrophone beams intersect the fans; wherein the Doppler system utilizes a transmitter message for ensonifying $i >= 2$ fans, the message including at least one pulse pair per fan, $j >= 2$ hydrophone beams per fan, and hydrophone returns processed to calculate for each of $(i*j)$ beams respective Doppler radial velocity estimates $DRV_{i,j}$ such that simultaneous consideration of the $DRV_{i,j}$ provides an estimated relative velocity.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

FIGS. 1B-F show embodiments of at least portions of the multibeam echo sounder system of FIG. 1A.

FIG. 1G shows a legend of selected symbols.

FIGS. 3A-F show multifan survey system operations for use with the multibeam echo sounder system of FIG. 1A.

FIGS. 4A-I show source velocity evaluation calculations and methods for use with the multibeam echo sounder systems similar to that of FIG. 1A.

FIG. 4J shows velocity calculations and methods for use with multibeam echo sounder systems similar to that of FIG. 1A where the operating mode is a Doppler Velocity Log ("DVL") mode.

FIGS. 5A-F show pulse-pair messages for use with the multibeam echo sounder system of FIG. 1A.

DETAILED DESCRIPTION OF THE PREFERRED EMBODIMENTS

The disclosure provided in the following pages describes examples of some embodiments of the invention. The designs, figures, and description are non-limiting examples of the embodiments they disclose. For example, other embodiments of the disclosed device and/or method may or may not include the features described herein. Moreover, described features, advantages or benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

Multibeam Echo Sounder

FIGS. 1A-E show a survey system including a multibeam echo sounder system and describe exemplary multibeam echo sounder embodiments. FIG. 1G shows a legend 100G of selected symbols appearing on FIGS. 1C-F.

Figure 1A:
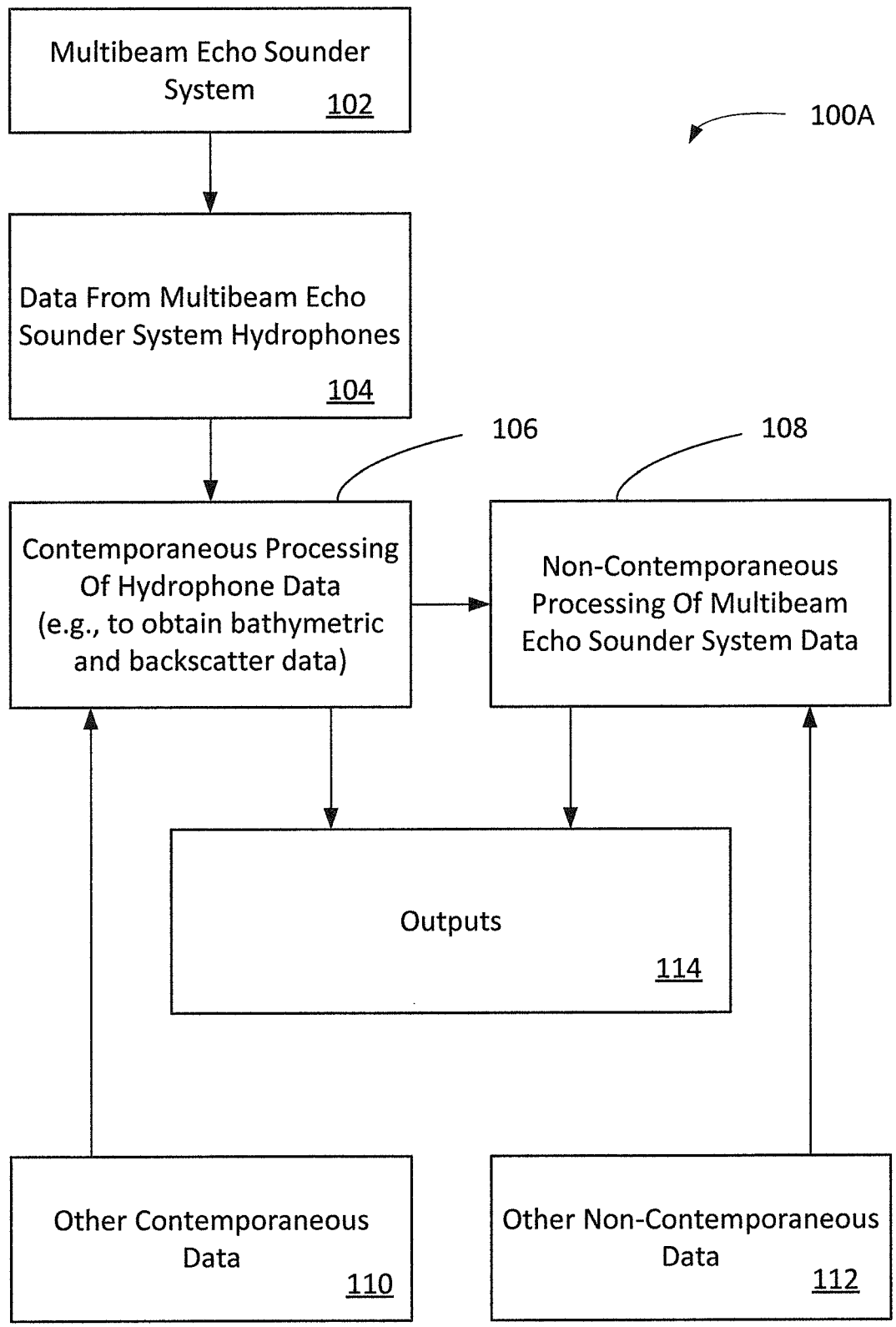
FIG. 1A shows a survey system including a multibeam echo sounder system of the present invention.

FIG. 1A shows a survey system in accordance with an embodiment of the present invention 100A. The survey system includes an echo sounder system such as a multibeam echo sounder system 102 which may be mounted on a surface vehicle or vessel, on a waterbody bottom, on a remotely operated vehicle, on an autonomous underwater vehicle, or the like. As is further described below, echo sounder and/or survey system outputs 114 may be contemporaneous with echo sounder processing of hydrophone data, as in some embodiments for bathymetry, or non-contemporaneous with processing of hydrophone data as in some embodiments for waterbody bottom classification.

Data acquired by multibeam echo sounder systems 104 include data from echo sounder listening devices such as hydrophones (e.g., transducers) that receive echoes which are related to the acoustic/pressure waves emanating from the echo sounder projectors but have returned by virtue of an interaction with inhomogeneities of many kinds. The interactions may take the form of reflection or scattering. The inhomogeneities, also known as reflectors and scattering centers, represent discontinuities in the physical properties of the medium. Exemplary scattering centers may be found in one or more of i) an ensonified volume of the waterbody such as a water column, ii) upon the ensonified surface of the bottom, or iii) within the ensonified volume of the sub-bottom.

Scattering centers of a biological nature may be present in the water column, as they are a part of the marine life. Scattering centers of a nonbiological nature may be present in the water column in the form of bubbles, dust and sand particles, thermal microstructure, and turbulence of natural or human origin, such as ships' wakes. Scattering centers on the surface of the bottom may be due to the mechanical roughness of the bottom, such as ripples, or be due to the inherent size, shape, and physical arrangement of the bottom constituents, such as mud, sand, shell fragments, cobbles, and boulders, or due to both factors. Scattering centers in the sub-bottom may be due to bioturbation of the sediments, layering of different sediment materials within the bottom, or buried manmade structures such as pipelines.

Data processing within the echo sounder system may include contemporaneous processing of hydrophone data 106, for example to obtain Doppler velocity data, bathymetric data, and/or backscatter data. Data processing may also include non-contemporaneous processing of multibeam echo sounder system data 108, for example to characterize bottom conditions or the water column.

Data processing may include utilization of complementary or other data. For example, contemporaneous processing of hydrophone data 106 may utilize contemporaneous 110 and/or non-contemporaneous 112 data such as contemporaneously collected geographic positioning system ("GPS") data, sound speed measurements, attitude, and navigational information. For example, non-contemporaneous processing of echo sounder system data may utilize contemporaneous 110 and/or non-contemporaneous 112 data such as non-contemporaneously collected waterbody bottom composition data and tidal records.

Figure 1B:
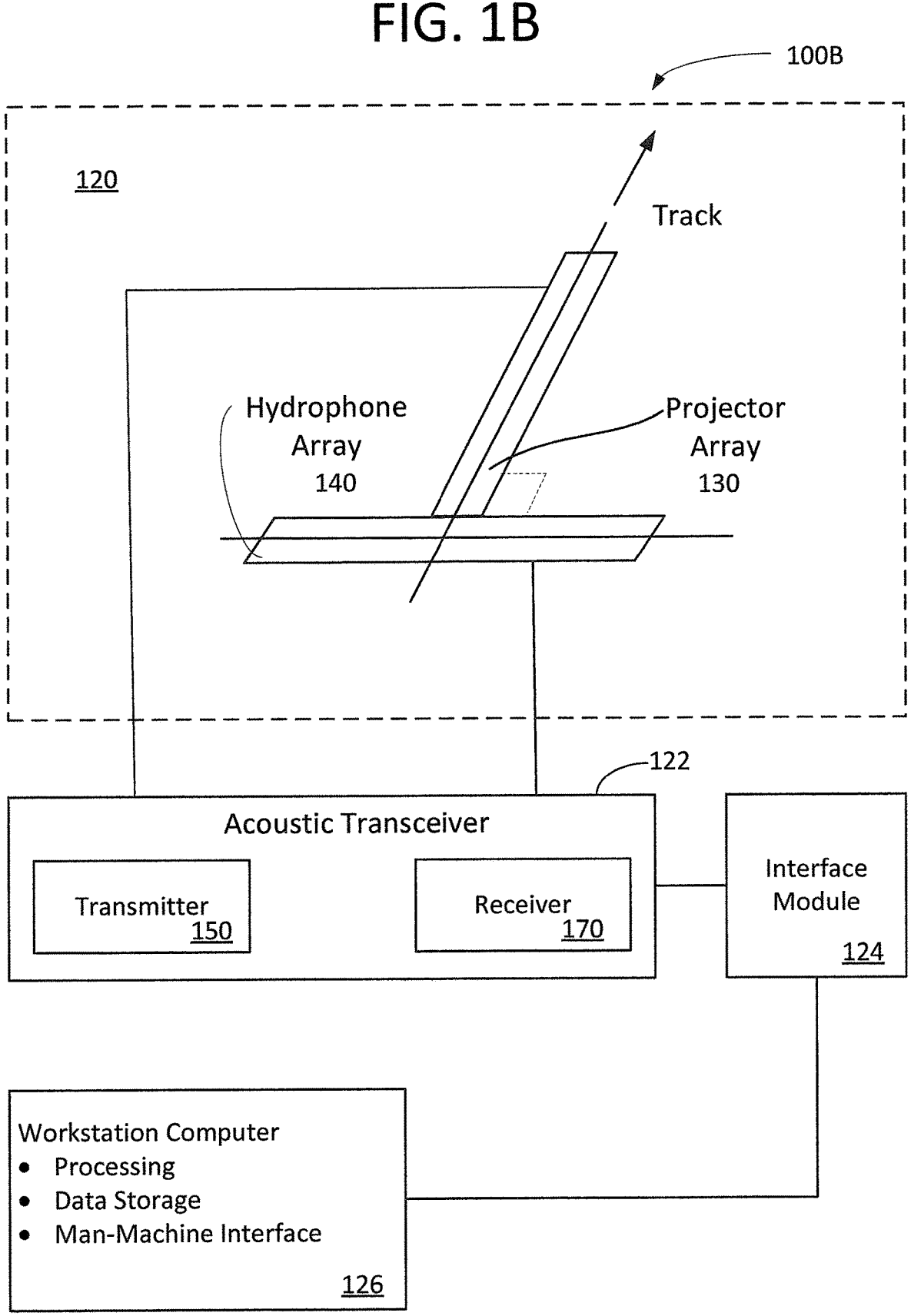

FIG. 1B shows portions of an exemplary multibeam echo sounder system ("MBES") 100B. The echo sounder system includes a transducer section 120 and an acoustic transceiver 122. The echo sounder system may include a transceiver interface such as an interface module 124 and/or a workstation computer 126 for one or more of data processing, data storage, and interfacing man and machine. Exemplary transducers, shown here in a typical Mills Cross arrangement 120, include a transmitter or projector array 130 and a receiver or hydrophone array 140. Projectors in the projector array may be spaced along a line that is parallel with a keel line or track of a vehicle or vessel to which they are mounted which may be referred to as an along track arrangement. In some embodiments, a receiver of the transceiver 122 has an operating frequency range corresponding to that of the projectors and/or the hydrophones.

During echo sounder operation, sound or pressure waves emanating from the projector array travel within a body of water and possibly within the bottom beneath the body of water and in doing so may undergo interactions, such as reflections or scattering, which disturb the propagation trajectory of the pressure waves. Some of the reflections or echoes are "heard" by the hydrophone array. See for example the disclosure of Etal, U.S. Pat. No. 3,144,631, which is included herein by reference, in its entirety and for all purposes.

The acoustic transceiver 122 includes a transmitter section 150 and a receiver section 170. The acoustic transceiver may be configured to transmit to one or more projector arrays 130 and to receive from one or more hydrophone arrays 140. Unless otherwise noted, the term transceiver does not require common packaging and/or encapsulation of the transmitter and receiver.

In various embodiments, a projector array may be a single projector array regardless of the geometry, arrangement, or quantity of devices employed. For example, where a plurality of projectors forms a plurality of spatially distinct projector groups, the plural projectors are a single projector array if they are operated to ensonify the entirety of a swath on a single ping, for example a swath of waterbody bottom or a swath of water column.

In various embodiments: i) a single projector array may ensonify the entirety of a swath on a single ping; ii) a plurality of projector arrays may ensonify the entirety of a swath on a single ping; iii) a plurality of projector arrays ensonify multiple swaths on a single ping; iv) a single projector array may ensonify multiple swaths on a single ping.

The echo sounder may further include a means such as an interface module 124 for interconnection with the transceiver 122. This interface module may provide, among other things, a power supply for the transceiver, communications with the transceiver, communications with the workstation computer 126, and communications with other sources of data such as a source of contemporaneous GPS data.

The workstation computer 126 may provide for one or more of data processing such as data processing for visualization of survey results, for data storage such as storage of current profiling data, bathymetry data, sound speed data, and backscatter data, for user inputs, and for display of any of inputs, system status, and survey results.

FIG. 1C shows portions of an exemplary multibeam echo sounder system ("MBES") 100C. The echo sounder system includes a transducer section 120, a transmitter section 150, and a receiver section 170. Some embodiments include a sensor interface section 190 and/or a management section 192. And in some embodiments it is the management block that signals and/or provides instructions to the signal generators 159.

The transducer section includes transducers for transmitting acoustic messages and transducers for receiving acoustic messages. For example, a transducer section may include an array of projectors 130 and an array of hydrophones 140.

Projectors in the projector array 130 may include piezoelectric elements such as ceramic elements. Element geometries may include circular and non-circular geometries such as rectangular geometries. Some projectors have an operating frequency range of about 10 kHz to 100 kHz, of about 50 kHz to 550 kHz, or about 100 to 1000 kHz.

Hydrophones in the hydrophone array 140 may include piezoelectric elements such as ceramic elements. Element geometries may include circular and non-circular geometries such as rectangular geometries. Some hydrophones have an operating frequency range of about 10 kHz to 100 kHz, of about 50 kHz to 550 kHz, or about 100 to 1000 kHz.

During operation of the projector array 130 and hydrophone array 140, the transmitter section excites the projector array, an outgoing message 137 emanates from the projector array, travels in a liquid medium to a reflector or scattering center 138, is reflected or scattered, after which a return or incoming message 139 travels to the hydrophone array 140 for processing by the receiver 170. Notably, the acoustic/pressure wave input 136 received at the hydrophone array 140 may include a Doppler shifted or otherwise modified version of the transmitted message 137 along with spurious signal and/or noise content.

The transmit section 150 may include a signal generator block 158, a transmit beamformer block 156, a summation block 154, and a power amplifier block 152. The transmit section provides for generation of or for otherwise obtaining one or more signals or message components 158 that will be used to compose a message 137. Notably, a message may be composed of multiple signals or not. Where a message is composed of multiple signals, the message may contain i) signals in parallel (superposed), ii) signals that are serialized (concatenated), or iii) may be a combination of parallel and serial signals.

The transmit beamformer block 156 receives the signal(s) from the signal generator block 158 where beamforming for each signal takes place. The beam(s) are combined in the summation block 154 to construct a parallel, serial, or combination message M. In the power amplifier block 152, the time series voltages of the message are amplified in order to excite or drive the transducers in the projector array 130. In an embodiment, each transducer is driven by a respective amplifier.

The receive section 170 includes multiple hydrophone signal processing pipelines. In an embodiment the receive section includes a hardware pipelines block/analog signal processing block 172, a software pipelines block/digital signal processing block 174, a receive beamformer block 176, and a processor block 178. The receive section provides for isolating and processing the message 137 from the input 136 received at the hydrophone array 140. For example, some embodiments process echoes to determine Doppler velocities and/or depths as a function of, among other things, round trip travel times.

In the hardware pipeline block 172, plural hydrophone array transducers of the hydrophone array 140 provide inputs to plural hardware pipelines that perform signal conditioning and analog-to-digital conversion. In some embodiments, the analog-to-digital conversion is configured for oversampling where the converter Fin (highest input frequency) is less than $F_s/2$ (one half of the converter sampling frequency). In an embodiment, a transceiver 122 operates with a maximum frequency of about 800 kHz. In an embodiment the transceiver utilizes analog-to-digital converters with sampling rates in a range of about 5 to 32 MHz. In an embodiment the transceiver utilizes analog-to-digital converters with sampling rates of about 5 MHz to about 32 MHz.

In the software pipeline block 174, the hardware pipelines 172 provide inputs to the software pipelines. One or more pipelines serve each of the hydrophones in the hydrophone array. Each software pipeline may provide, among other things, downconversion and/or filtering. In various embodiments, the software pipeline may provide for recovery of a message from a hydrophone input 136. In an embodiment, the hydrophones 140 may be served by pipelines for one or more of interpreting, distinguishing, deconstructing and/or decoding a message such as a multicomponent message.

In the receive beamforming or steering block 176, the software pipelines 174 provide beamformer inputs. Beamformer functionality includes phase shifting and/or time delay and summation for multiple input signals. In an embodiment, a beamformer is provided for each of multiple signals. For example, where software pipelines operate using two signals, inputs to a first beamformer are software pipelines processing a first signal and inputs to a second beamformer are software pipelines processing a second signal. Notably, signals may be coded or not. When coded signals are used, the code may or may not be used to distinguish one signal from another.

In the processor block 178, the beamformers of the beamformer block 176 provide processor inputs. Processor functionality may include any one or more of bottom detection, backscatter processing, data reduction, Doppler processing, acoustic imaging, and generation of a short time series of backscatter sometimes referred to as "snippets."

In an embodiment, a management section 192 and a sensor interface section 190 are provided. The management section includes an interface module 194 and/or a workstation computer 196. The sensor interface section provides for interfacing signals from one or more sensors ES1, ES2, ES3 such as sensors for time (e.g. GPS), motion, attitude, and sound speed.

In various embodiments, control and/or control related signals are exchanged between the management section 192 and one or more of the power amplifier block 152, software pipelines block 174, transmit beamformer block 156, receive beamformer block 176, signal generator block 158, processor block 178. And, in various embodiments sensor interface section data 190 are exchanged with the management section 192 and the processor block 178.

Figure 1D:
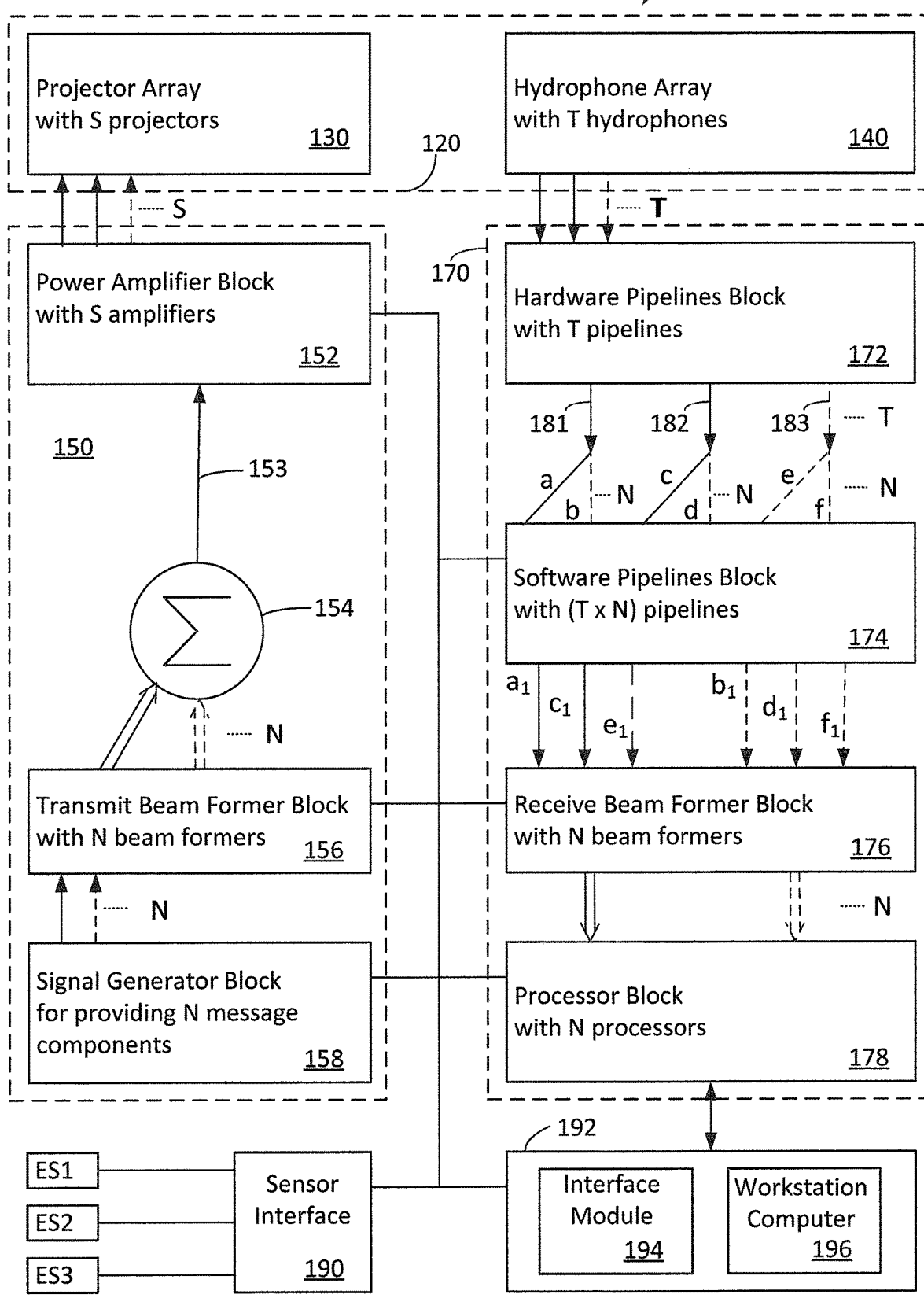

FIG. 1D shows portions of an exemplary multibeam echo sounder system ("MBES") 100D. The echo sounder system includes a transducer section 120, a transmitter section 150, and a receiver section 170. Some embodiments include an interface section 190 and/or a management section 192.

In the embodiment shown, a message 153 incorporating quantity N signals is used to excite plural projectors in a projector array and a receiver having quantity T hardware or software pipelines and (T*N) hardware or software pipelines may be used to process T hydrophone signals for recovery of echo information specific to each of the N signals.

In various embodiments, first and second serialized signals within the same message may be identical as with pulse pairs associated with Doppler velocity measurements described below.

The transmitter section 150 is for exciting the projector array 130. The section includes a signal generator block 158, a transmit beamformer block 156, a summation block 154, and a power amplifier block 152.

The signal generator block 158 may generate quantity N signals or message components. In some embodiments, each of plural signals within a message is a coded signal that shares a common center frequency and/or a common frequency band. And, in some embodiments, each of plural signals within a message has a unique, non-overlapping frequency band.

A transmit beamformer block 156 receives N signal generator block outputs. For each of the N signals generated, the beamformer block produces a group of output beam signals such that N groups of output beam signals result.

The summation block 154 receives and sums the signals in the N groups of output beams to provide a summed output 153.

The power amplifier block 152 includes quantity S amplifiers for driving respective projectors in the projector array 130. Each power amplifier receives the summed output or a signal that is a function of the summed output 153, amplifies the signal, and drives a respective projector with the amplified signal.

An array of quantity T hydrophones 140 is for receiving echoes of acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipeline block 172, T pipelines provide independent signal conditioning and analog-to-digital conversion for each of the T hydrophone signals.

In the software pipeline block 174, (T*N) software pipelines may provide downconversion and/or filtering for each of the T hardware pipeline outputs. Means known in the art, for example filtering such as band pass filtering, may be used to distinguish different signals such as signals in different frequency bands. As shown, each of T hardware pipeline outputs 181, 182, 183 provides N software pipeline inputs a,b and c,d and e,f (i.e., 3*2=6 where T=3 and N=2).

In the receive beamformer block 176, (T*N) software pipeline block 174 outputs are used to form N groups of beams. A beamformer is provided for each of N signals. For example, where there are T=3 hydrophones and software pipelines process N=2 signals, inputs to a first beamformer are software pipelines processing the first signal $a_1$, $c_1$, $e_1$ and inputs to a second beamformer are software pipelines processing the second signal $b_1$, $d_1$, $f_1$.

In the processor block 178, N processors receive respective groups of beams formed by the beamformer block 176. Processor block 178 data are exchanged with a management section 192 and sensor interface 190 data ES1, ES2, ES3 are provided to the management section and/or the processor block.

In various embodiments control signals from the management block 192 are used to make power amplifier block 152 settings (e.g., for "S" power amplifiers for shading), to control transmit 156 and receive 176 beamformers, to select software pipeline block 174 operating frequencies, and to set signal generator block 158 operating frequencies.

As the above illustrates, the disclosed echo sounder transmitter may construct a message incorporating N components such as N signals. And, the echo sounder may utilize a receiver having T hardware pipelines and (T*N) software pipelines to process T hydrophone signals for recovery of echo information specific to each of the N message components.

Figure 1E:
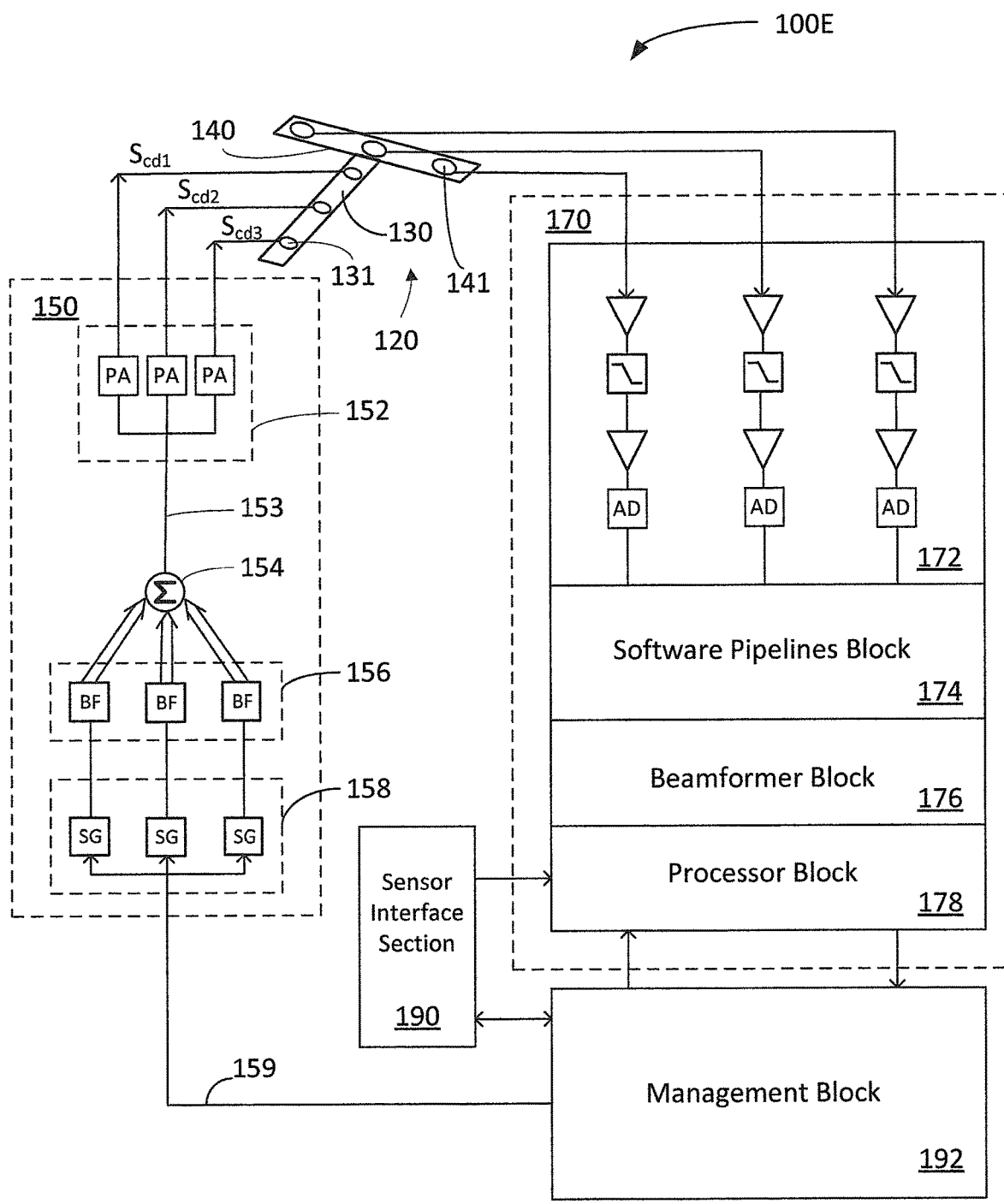
Figure 1F:
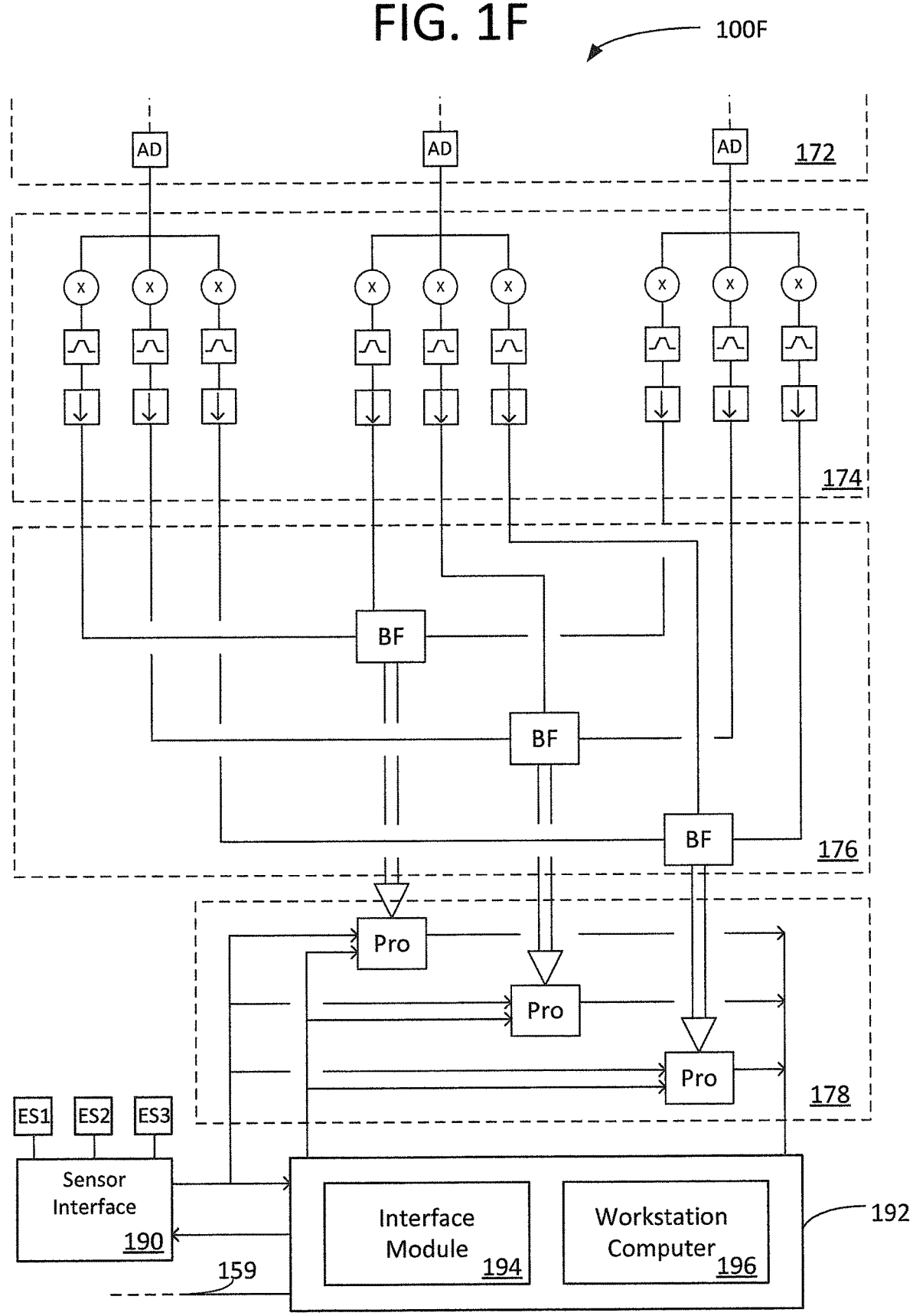

FIGS. 1E-F show portions of an exemplary multibeam echo sounder system ("MBES") 100E-F. The echo sounder system includes a transducer section 120, a transmitter section 150, and a receiver section 170. Some embodiments include an interface section 190 and/or a management section 192.

In the embodiment shown, a message 153 incorporating first, second, and third message components such as signals $S_{cd1}$, $S_{cd2}$, $S_{cd3}$ where N=3 is used to excite three projectors in a projector array, and a receiver having three hardware pipelines and nine software pipelines is used to process three hydrophone signals T=3 to recover echo information specific to each of the N message components.

The transmitter section 150 is for exciting the projector array 130. The section includes a signal generator block 158, a transmit beamformer block 156, a summation block 154, and a power amplifier block 152.

In the signal generator block 158, signals are constructed, generated, recalled and/or otherwise provided. Here, an exemplary process is depicted with e.g., N=3 signal generators. In respective beamformers of the beamformer block 156, multiple beams are generated from each signal. In a summation block 154, the beams are combined to produce a summation block output signal or transmit message 153.

The transducer block 120 includes a projector array 130 and a hydrophone array 140 arranged, for example, in a typical Mills Cross arrangement. As shown, there are three projectors 131 in the projector array and three hydrophones 141 in the hydrophone array. In the power amplifier block 152, the summed signal or transmit message 153 is an input to power amplifiers driving respective projectors.

Applicant notes that for convenience of illustration, the projector and hydrophone counts are limited to three. As skilled artisans will appreciate, transducer arrays do not require equal numbers of projectors and hydrophones nor do the quantities of either of these types of transducers need to be limited to three. For example, a modern multibeam echo sounder might utilize 1 to 96 or more projectors and 64 to 256 or more hydrophones.

The array of T=3 hydrophones 141 is for receiving echoes resulting from the acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipelines block 172, each of T=3 hardware pipelines processes a respective hydrophone 141 signal through analog components including an analog-to-digital converter. In the embodiment shown, a hardware pipeline provides sequential signal processing through a first amplifier, an anti-aliasing filter such as a low pass anti-aliasing filter, a second amplifier, and an analog-to-digital converter.

In the software pipelines block 174, each of the T=3 hardware pipeline outputs is processed through N=3 software pipelines with downconversion and band pass filtering. In the embodiment shown, a software pipeline provides sequential signal processing including processing through a mixer (an oscillator such as local oscillator may be coupled to the mixer), a bandpass filter, and a decimator. Communications may occur via communications links between any of the processor block 178, the signal generator block 158, the hardware pipelines block 172, the software pipelines block 174, the and the beamformer block 176. See for example FIGS. 1C-D.

Each software pipeline may have a single mixer and/or each hardware pipeline may have no mixer. A processor 178 may control gain of a first and/or a second hardware pipeline amplifier. A processor may provide for tuning, for example via a processor controlled oscillator coupled with a mixer.

In the receive beamformer block 176, each of N=3 beamformers processes signals. As such, i) a first set of three software pipeline outputs corresponding to a first signal are processed by a first beamformer, ii) a second set of three software pipeline outputs corresponding to a second signal are processed by a second beamformer, and (iii) a third set of three software pipeline outputs corresponding to a third signal are processed by a third beamformer. Notably, beamformers may be implemented in hardware or software. For example, one or more beamformers may be implemented in one or more field programmable gate arrays ("FPGA").

In the processor block 178, each of N=3 processors are for processing respective beamformer outputs. Here, a first plurality of beams generated by the first beamformer is processed in a first processor, a second plurality of beams generated by the second beamformer is processed in a second beamformer, and a third plurality of beams generated by the third beamformer is processed in a third beamformer.

Processor outputs interconnect with a management section 192. Notably, one or more processors may be implemented in a single device such as a single processor or digital signal processor ("DSP") or in multiple devices such as multiple signal processors or digital signal processors.

Complementary data may be provided via, inter alia, a sensor interface section 190 that is interfaced with a plurality of sensors ES1, ES2, ES3. The sensor interface module may provide sensor data to the management section 192 and/or to processors in the processor block 178.

The management section 192 includes a sonar interface 194 and/or a workstation computer 196. In various embodiments control signals from the management block 192 are used for one or more of making power amplifier block 152 settings (e.g., for array shading), controlling transmit beamformers 156 and receive beamformers 176, selecting software pipeline block 174 operating frequencies, setting set signal generator block 158 operating frequencies, and providing processor block 178 operating instructions.

Applicant notes that the echo sounder systems of FIGS. 1C-F may be used to process hydrophone returns from targets i) present within an ensonified volume of the water body, ii) upon an ensonified surface of the bottom, or iii) lying within an ensonified volume of the bottom.

In various embodiments, the MBES of FIGS. 1E-F distinguishes among signals based on frequency or frequency band. In various embodiments, the MBES of FIGS. 1E-F does not distinguish among signals using matched filtering.

MBES Message Cycle

Figure 2A:
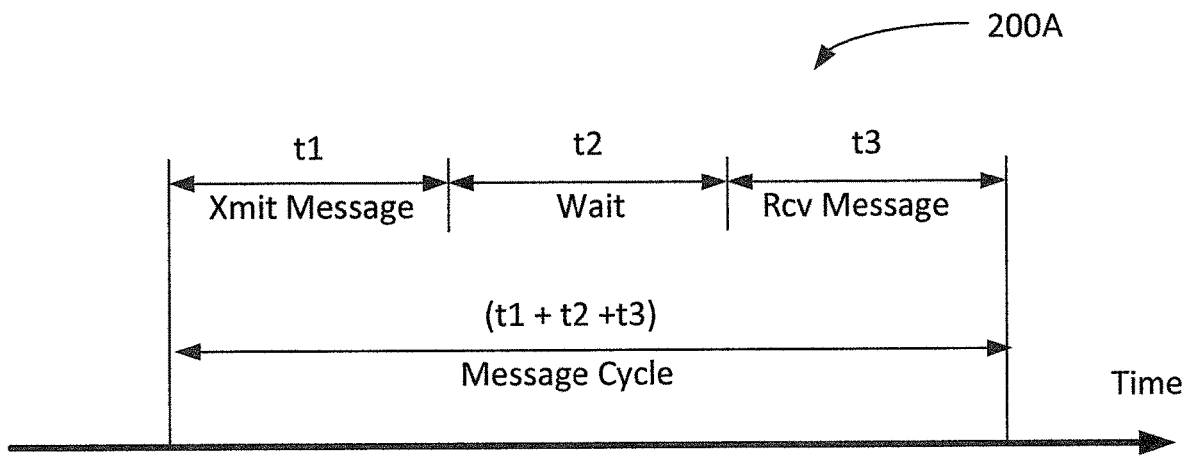
FIGS. 2A-B show message cycles for use with the multibeam echo sounder system of FIG. 1A.

FIG. 2A shows a first message cycle 200A. The cycle includes a sequence of operations with transmission of a message during a time t1 and reception of a message during a time t3. Transmission of a message refers to a process that excites the projector array 130 and reception of a message refers to a complementary process including message echo receipt by the hydrophone array 140. A wait time t2 that varies primarily with range, angle, and sound speed may be interposed between the end of the message transmission and the beginning of the message reception. This wait time may be determined by the sonar range scale setting or round trip travel time for the longest sounding range, for example a return from the most distant observed location or cell in a swath ensonified by the projector array. In some embodiments, the message transmit length is in a range of 10 to 60 microseconds. In some embodiments, the transmit message length is about 5-15 milliseconds or 10 milliseconds.

Figure 2B:
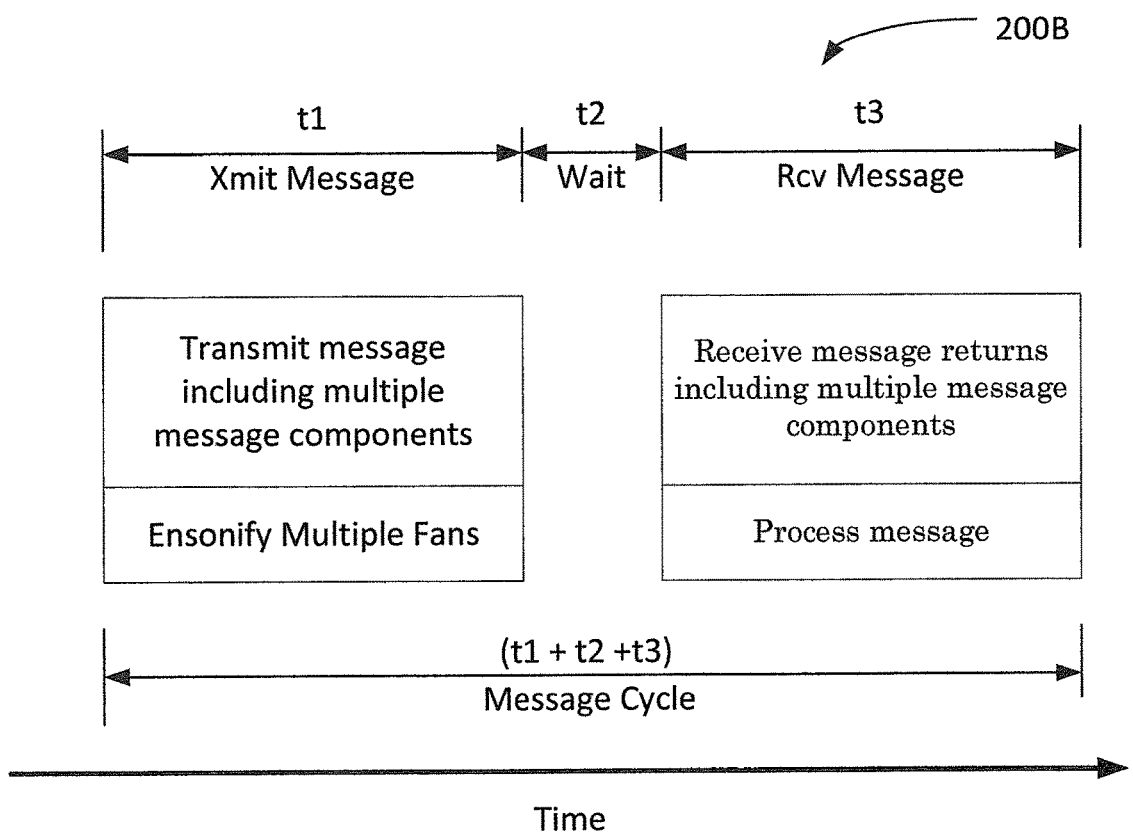

FIG. 2B shows a second message cycle 200B. Here, a transmitted message includes multiple message components. During transmission of the message, each of the message components may be steered as by beamformers 156 to ensonify a respective fan of a waterbody bottom as is further explained below. Each of the transmitted message components results in a similar message component return. Filtering in the receiver separates these returns such that data specific to each fan is available for analyses.

Multimode Doppler Operations

As mentioned above, the MBES disclosed in FIGS. 1A-F may be operated in multiple modes. These modes include various Doppler Velocity Log ("DVL") modes and various Acoustic Doppler Current Profiling ("ADCP") modes.

When operating the MBES in a typical DVL navigation mode, the MBES may be placed on a moving platform such as a surface vessel for targeting a stationary reflector such as a waterbody bottom.

When operating the MBES in a typical ADCP current profiling mode, the MBES may be placed on a stationary platform such as a waterbody bottom for targeting reflectors and/or scatterers entrained in a moving water column. The MBES may also be placed on a water vehicle while in ADCP operating mode.

As skilled artisans will appreciate, acoustic Doppler measurements may be used to determine velocity and the velocity determined may be, whether in a DVL or an ADCP mode, a relative velocity between the MBES and the reflector or source of the backscattered acoustic energy.

Multifan Operations

Figure 3B:
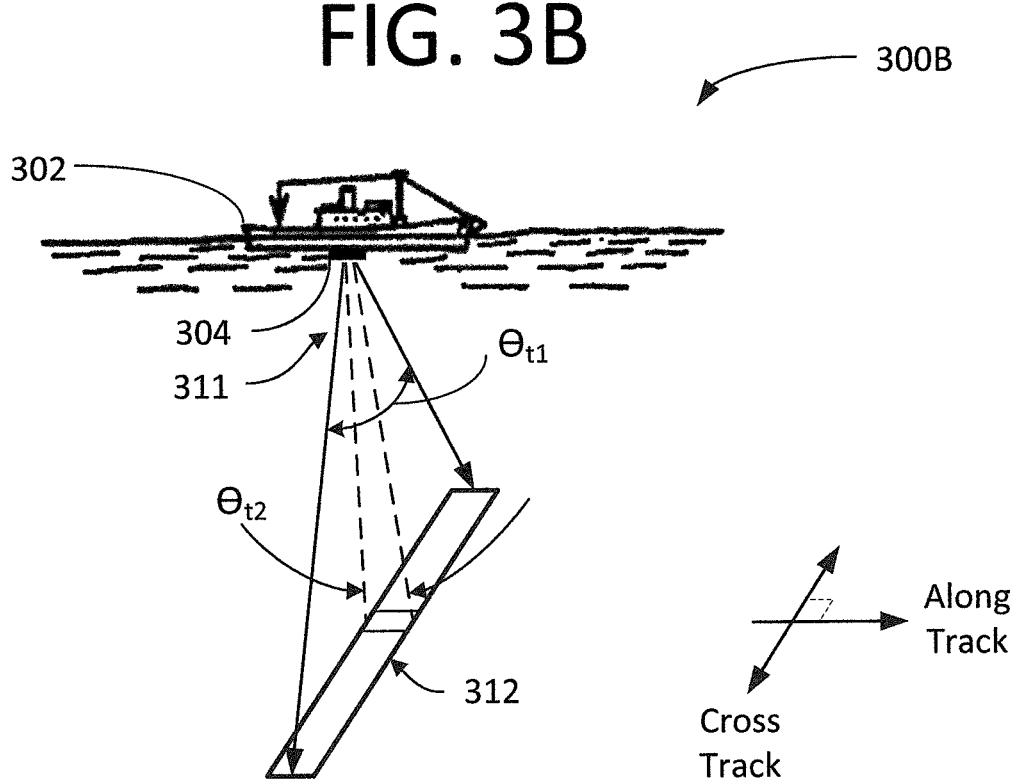

FIGS. 3A-D show an exemplary vessel equipped with a multibeam echo sounder 300A-D. See for example the echo sounders of FIGS. 1A-E. As seen in FIG. 3A, an MBES array package 304 is affixed to a vessel 302, for example to a bottom of the vessel.

Within the array package 304 is an along track array of projectors 308 and a cross track array of hydrophones 310. The projector array is for excitation by a transmit message such as the message of FIG. 2A or FIG. 2B. The hydrophone array is for receiving echoes of the transmitted message.

Applicant notes that for convenience of illustration, all arrays are pictured herein as linear arrays of projectors or hydrophones. This is because a linear receiver array mounted perpendicular and adjacent to a projector array, forming the capital letter "T" in the modern English alphabet, is a cost-effective means of implementing the Mills Cross technique, explained below, in a sonar design. It is cost-effective because, with two line arrays of L elements each, it can provide the high spatial resolution in two dimensions that would otherwise require a fully populated L×L array to achieve the desired spatial resolution.

The Mills Cross technique employs two asymmetric and intersecting beampatterns to achieve a composite beam corresponding to the intersection of the two beams. The technique originated in the field of radio astronomy where both beampatterns were associated with a line of receivers. The Mills Cross technique was modified when it migrated into the field of sonar. Here, one beampattern became typically that of a line array transmitter and the other beampattern became typically that of a line array receiver. The transmit and receive arrays in an active sonar utilizing the Mills Cross technique are collectively referred to as a Mills Cross array. A zone or area of the waterbody bottom or water column that is both ensonified by the transmit portion of a Mills Cross array and observed by a receiver portion of the same Mills Cross array is at a particular location where the two beampatterns spatially overlap. Thus, Mills Cross functionality is a kind of spatial filtering.

As mentioned, Mills Cross' perpendicular projector and hydrophone arrays have with one transmit aperture substantially orthogonal to at least one receive aperture. This is a natural and widely used array geometry. However, other array geometries with intersecting beams may operate in a similar manner. For example, a variation of the Mills Cross array geometry may use non-perpendicular arrays and non-orthogonal transmit and receive beams. However, the beams may still intersect to provide a composite narrow beam cross-product. For example, in some embodiments, Mills Cross arrays mounted on the hull of a boat may have curvature resembling a bow. In other embodiments, array elements may be arranged in a semicircular, hemispherical or cylindrical pattern. What is important here is the presence of two distinct arrays whose transmit and receive beams intersect at a particular waterbody location, and where the dimension of that area is defined in the along-track direction by one array and the dimension of that area in the cross-track direction is defined by the other array.

FIG. 3B shows bottom ensonification 300B. In particular, an across track fan of a waterbody bottom 312 is ensonified by the projector array 308. Note the along track projector array 308 ensonifies an across track fan. As shown, the projected beam 311 has a wide across track aperture angle $\theta_{t1}$ as compared with a relatively narrow along track aperture angle $\theta_{t2}$. Echoes from this ensonified fan may be received by the hydrophone array 310.

DVL bottom-tracking mode: In light of the multimode Doppler operations discussed above, it will be appreciated that FIGS. 3A-B illustrate operation of an MBES in a DVL bottom-tracking mode where the MBES is moving and the reflector(s), for example reflectors on a sea floor, are assumed to be stationary. DVL water-tracking mode: Another configuration called DVL water-tracking mode exploits backscatter from a moving water layer within the water column to estimate a moving MBES' relative velocity through the water. ADCP mode: Additionally, if the MBES of FIGS. 3A-B is stationary and oriented such that a vertical fan in the water column is ensonified from above or below, the MBES mode of operation becomes an ADCP mode. Each of FIGS. 3C-F may be viewed in a similar manner to visualize multifan ensonification of the water column during an ADCP or DVL water-tracking mode of operation.

Figure 3C:
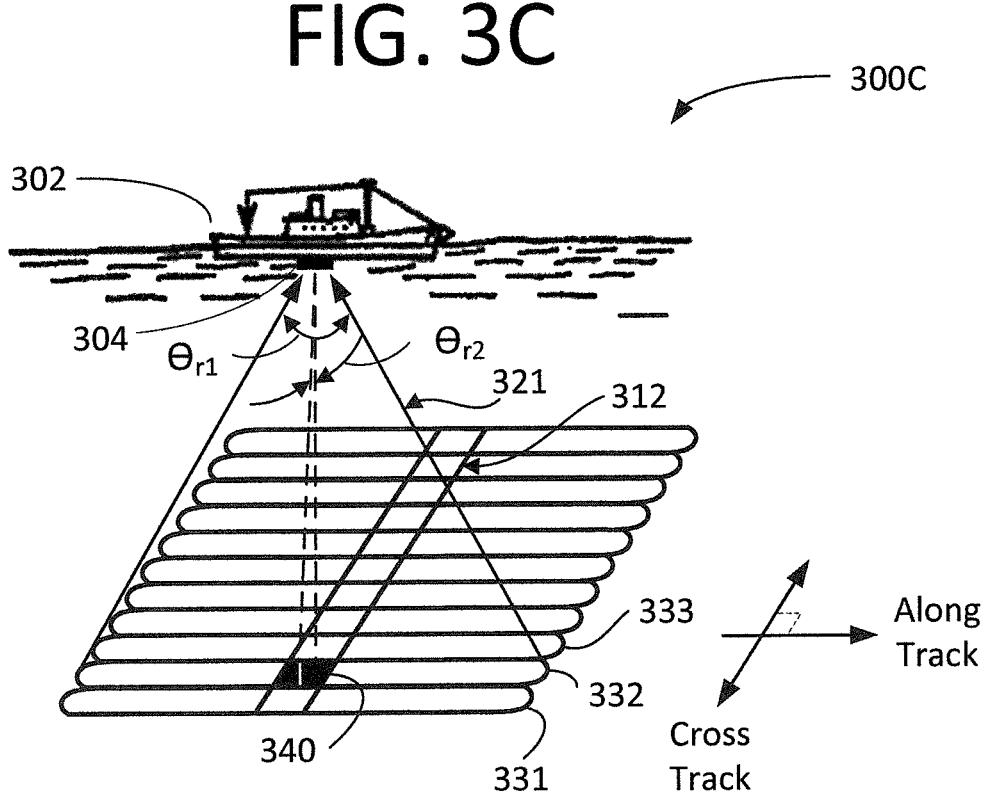

FIG. 3C shows bottom ensonification and echoes that result from the bottom 300C. In particular, echoes from the ensonified across track zone or fan 312 are received by the hydrophone array 310. As shown, the received beam 321 has a wide along track aperture angle $\theta_{r1}$ as compared with a relatively narrow across track angle $\theta_{r2}$. And, as shown, the hydrophone array beam may be steered to observe or read a set of along track strips 331, 332, 333 . . . that intersect the fan 312 at multiple adjacent or overlapping locations. Data such as bathymetric data may be obtained from and associated with each of these intersecting locations or areas 340 such that each time an across track fan is ensonified, multiple receiving beams observe multiple receiving strips and provide bathymetric data at multiple locations along the fan.

Just as a single fan 312 may be observed or read by multiple receiving beams 321, so too may multiple fans be observed or read by multiple receiving beams.

Figure 3D:
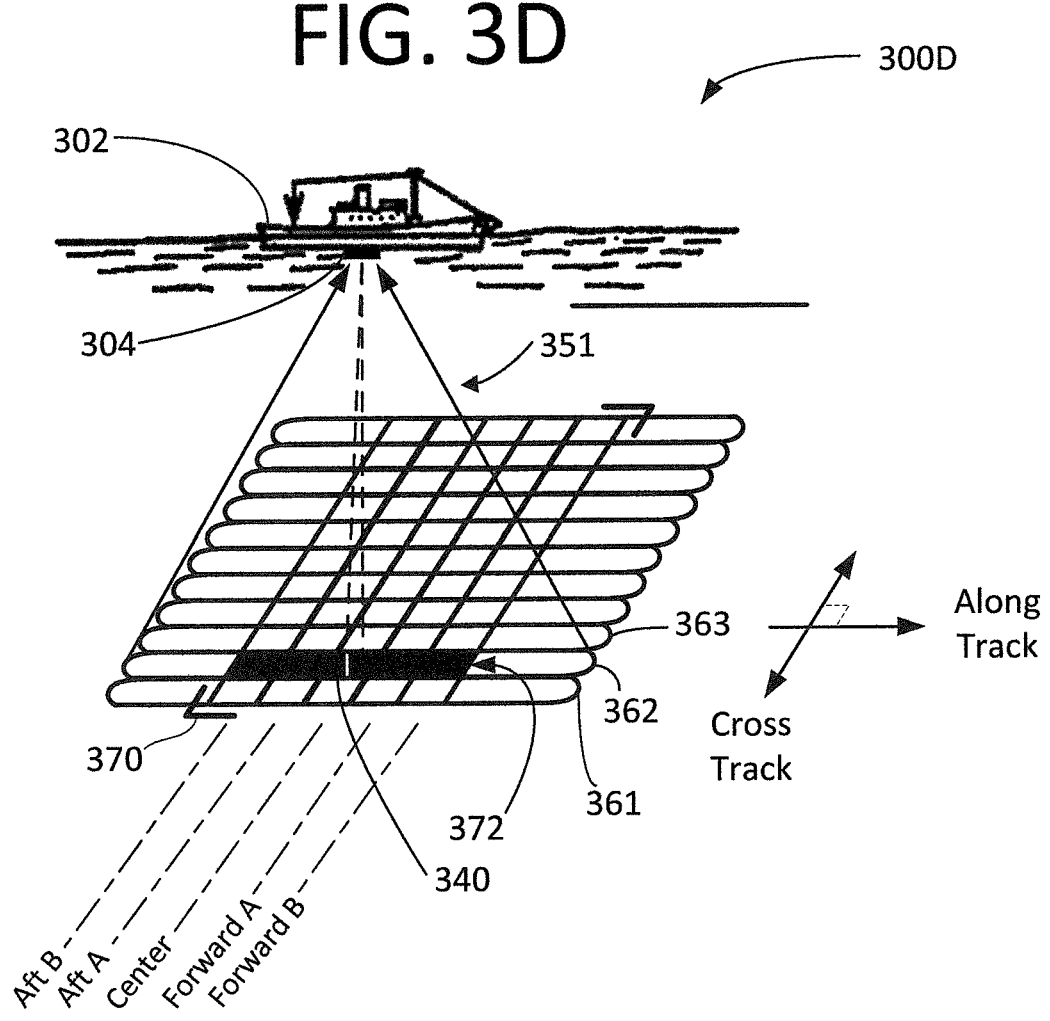

FIG. 3D shows multifan bottom ensonification 300D. Here, the projector array is steered to produce multiple adjacent or overlapping fans that are oriented across track. While any number of fans, such as 2, 3, 4, 5, 10 or more fans, may be ensonified, the example of FIG. 3D shows five fans comprising a center fan flanked by Forward A and Aft A fans which are flanked by Forward B and Aft B fans respectively. As before, multiple receiving beams 351 provide a set of along track receiving strips 361, 362, 363. These receiving strips intersect the multiple fans 372.

When a receiving strip 362 intersects multiple fans, a plurality 372 of cells 340 may be observed. And, when multiple receiving strips 361, 362, 363 . . . intersect multiple fans, a grid-like or two dimensional zone 370 results and bathymetric data may be obtained from each of the cells identified by intersections within the zone.

Applicant notes that as shown in FIG. 3D each of the fans has opposed cross-track boundaries that are essentially straight lines. This presentation is idealized. In practice, these opposed fan boundaries may be curved. For example, fan outlines on a waterbody bottom may be parabolic in shape with a cross-track major dimension. Transmit beamforming and/or other than planar waterbody bottoms may contribute to fans having other than straight cross-track boundaries but that does not preclude locating the centers of the cells 340.

Advantages of multifan operation may include increased survey speed resulting from, for example, an extended along track zone of ensonification, redundancy via overlapping of zones (e.g., where a fifty percent overlap between pings may provide two looks at every waterbody bottom location observed), and imaging a given target from multiple aspects. For example, imaging from multiple aspects including at nadir and from two opposing off-nadir sides. For example, imaging from multiple aspects including front, overhead, and behind.

In various embodiments, realizing the benefits of a multifan survey system requires an MBES capable of distinguishing between echoes returned from each of the fans. And, in various embodiments, any of temporal, spectral, or code separation techniques may be used to relate an echo to the fan from which it originated. In some embodiments, frequency separation is used to associate returns with particular fans as is further explained below. And in an embodiment, temporal separation is used to distinguish message components in a multicomponent message. And, in an embodiment, temporal separation is used to distinguish message components in a multicomponent message transmitted over one or more message cycles.

Figure 3E:
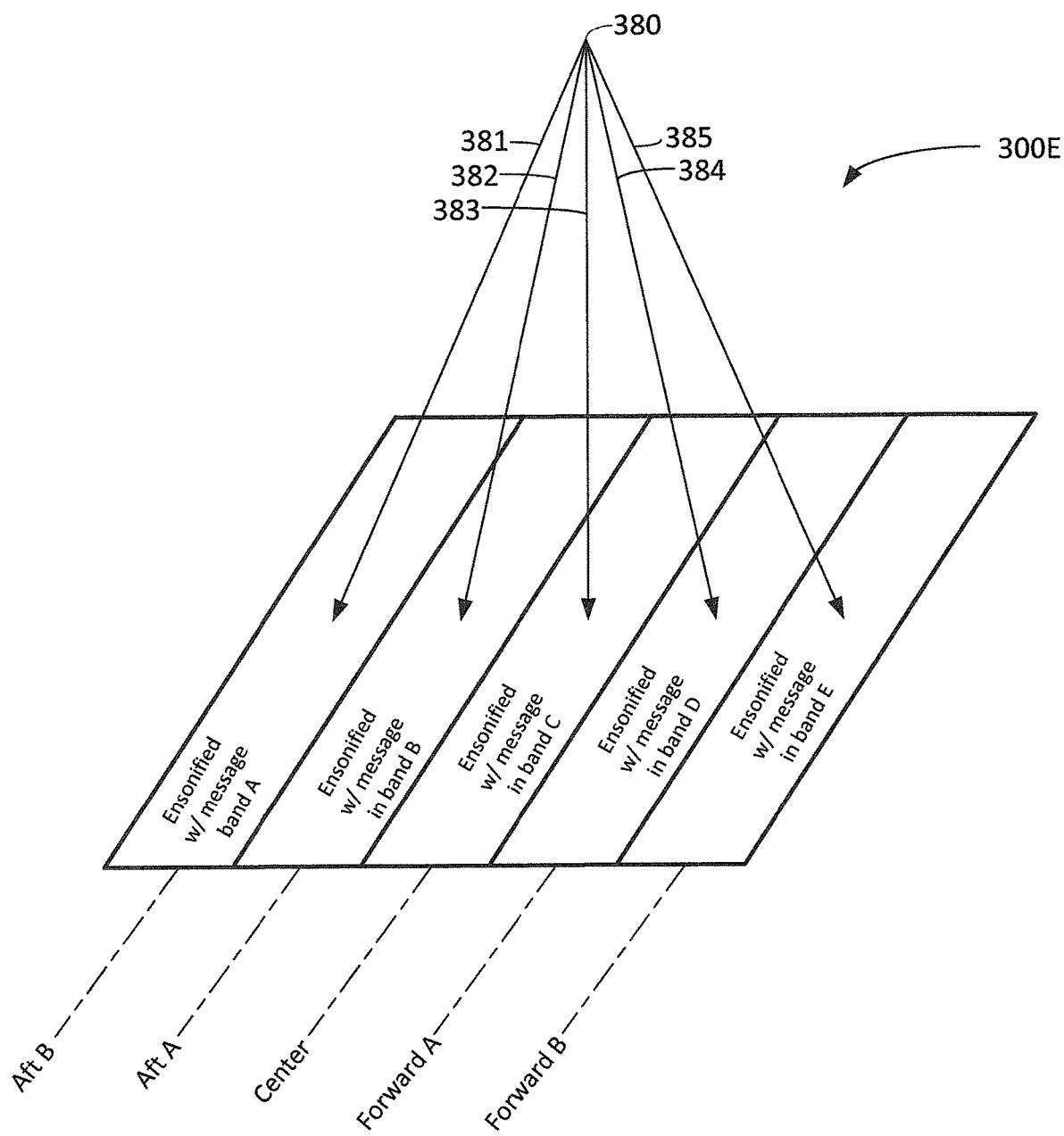

FIG. 3E shows a transmitted message ensonifying five fans 300E. Here, an MBES projector array 308 projects 380 five formed beams 381-385 to ensonify a center fan, Aft A and Forward A fans flanking the center fan, and peripheral Aft B and Forward B fans. Each of the five formed beams 381-385 ensonifies a respective fan with one of five differing frequency band signals.

In the example shown, Aft B fan is ensonified with signal 1 in frequency band A by the first beam 381, the Aft A fan is ensonified with signal 2 in frequency band B by the second beam 382, the Center fan is ensonified with signal 3 in frequency band C by the third beam 383, the Forward A fan is ensonified with signal 4 in frequency band D by the fourth beam 384, and the Forward B fan is ensonified with signal 5 in frequency band E by the fifth beam 385. Notably, five messages may be sent in five different frequency bands to ensonify the five fans. The messages may be sent concurrently and separated in the receiver by frequency band.

Figure 3F:
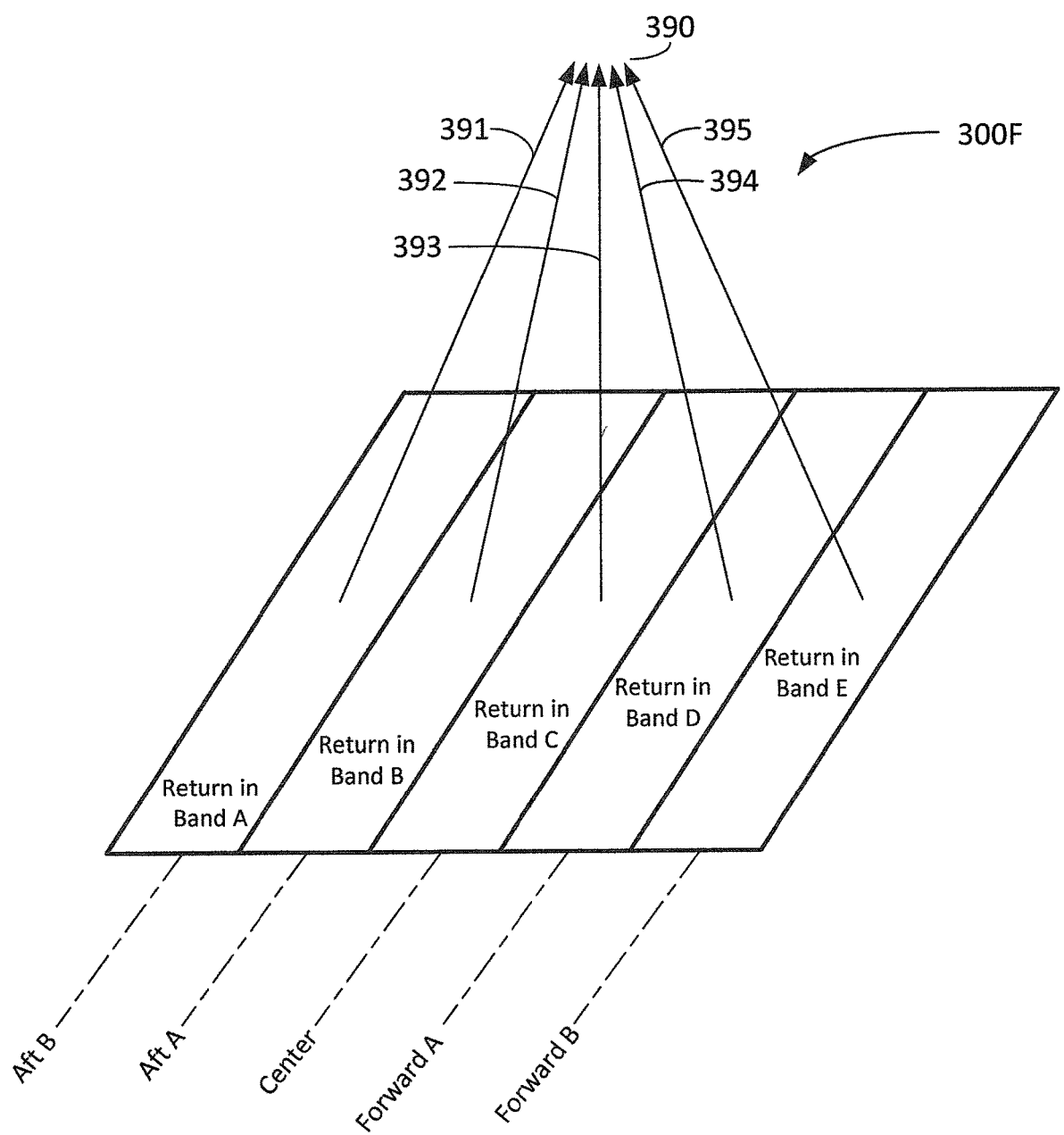

FIG. 3F shows returns 300F from the ensonified fans of FIG. 3E. Here, an MBES hydrophone array 310 receives returns 390 from the center fan 393, from Aft A and Forward A fans flanking the center fan 392, 394, and from peripheral Aft B and Forward B fans 391, 395.

It is noted that in some embodiments, one or multiple projector and/or hydrophone arrays may be used in connection with multifan operations. For example, multiple projectors or projector arrays might be used to simultaneously project multiple beams in respective fixed look directions. For example, multiple hydrophones or hydrophone arrays might be used to simultaneously acquire returns from multiple fixed look directions.

Acoustic Doppler Measurements

As shown above, an MBES may be designed, built, and operated to ensonify multiple fans. For example, a 256 beam system creating three ensonified zones or fans can acquire data from 3*256 beams. In the case of bathymetry and data from 3*256 waterbody bottom locations, this multiplicity of measurements may be used, for example, to improve survey speed and/or the density of survey measurements. In the case of navigation, this multiplicity of measurements may be used, for example, to improve the accuracy of velocities determined using acoustic Doppler techniques.

Where a source emits acoustic signals and a target moving relative to the source reflects the signals, acoustic Doppler techniques may be used to determine a velocity of the target relative to the source. For example, changes in acoustic wavelength of reflected signals (e.g., returns, echoes) may be used to determine a radial component of velocity. In some cases, the source is fixed and the target is moving. And, in some cases, the target is fixed and the source is moving.

Figure 4A:
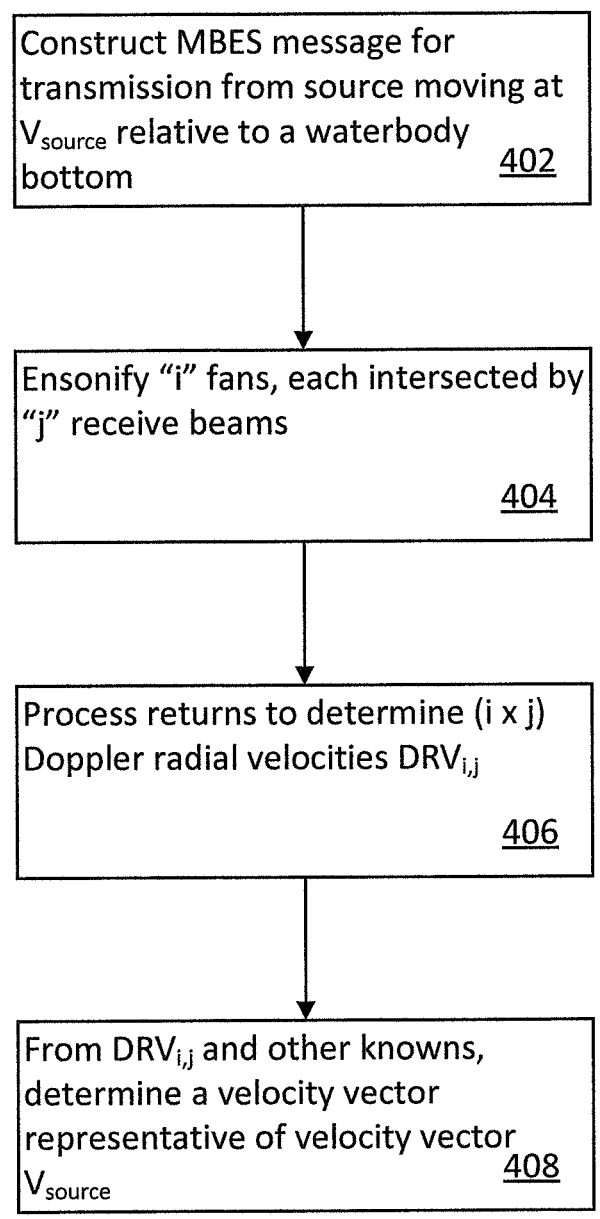

FIG. 4A shows a flowchart of steps that may be used in determining velocities from multifan data 400A. In a first step 402, a message is constructed. The message is for transmission from an MBES source moving relative to a waterbody bottom at velocity $V_{source}$. In various embodiments, the message includes a pulse pair such as a pair of identical pulses.

In a subsequent step 404, the message creates i fans that are in turn each intersected by j receive beams. Thereafter, in step 406, returns are processed and velocities, for example Doppler radial velocities $DRV_{i,j}$ associated with the beams, are determined. And, in a subsequent step 408, the Doppler radial velocities $DRV_{i,j}$ along with known variables such as fan and beam geometry are used to determine a velocity vector that is representative of $V_{source}$.

Notably, where each Doppler radial velocity $DRV_{i,j}$ is a projection of $V_{source}$ along a beam, each of the Doppler radial velocities can be said to be indicative of $V_{source}$.

In light of the multimode Doppler operations discussed above, it will be appreciated that FIG. 4A illustrates operation of an MBES in a DVL bottom-tracking mode where the MBES is moving and the reflector(s) are stationary. However, if the backscatter originates from a layer of the water column, the DVL operates in water-tracking mode. Additionally, if the MBES of FIG. 4A is made stationary and directed to target scattering centers in the water column, the MBES operates in an ADCP mode.

Figure 4B:
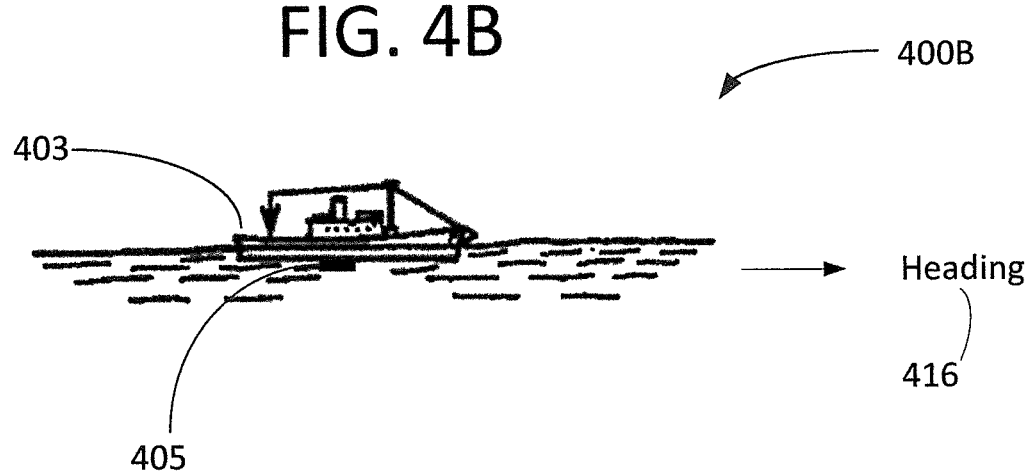
Figure 4C:
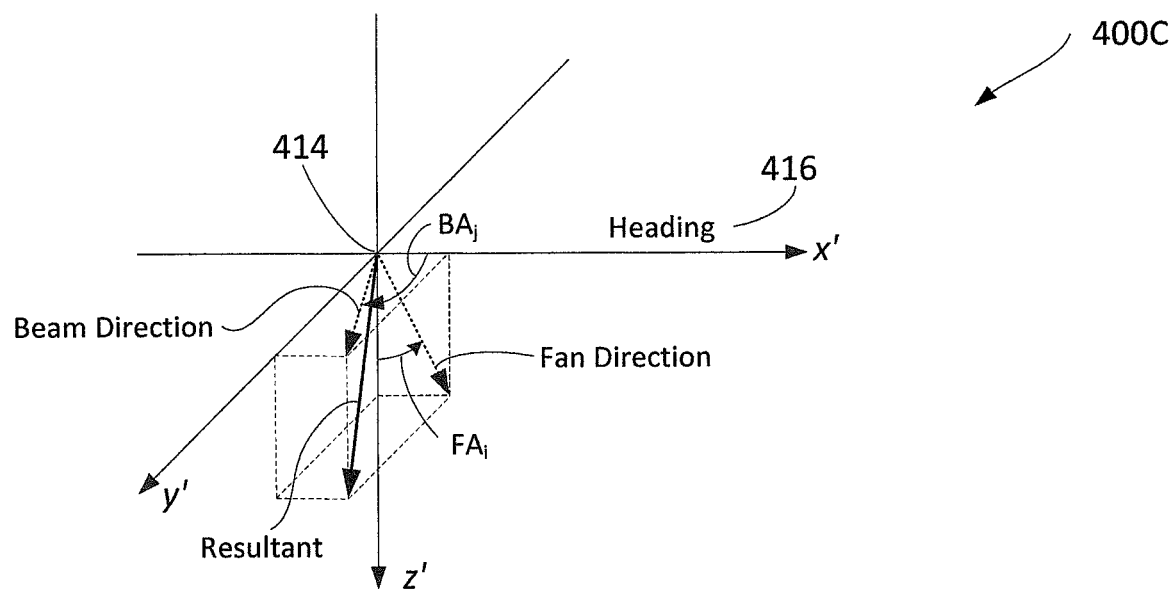

FIGS. 4B-C show a moving source 400B-C. As seen in FIG. 4B, a boat 403 carries a hull mounted MBES 405. The MBES 405 has a heading 416. A heading coordinate system with orthogonal axes x', y', z' is shown in FIG. 4C. The heading coordinate system has an origin centered on the source 414 and an x' axis aligned with the heading 416. Message beams emanating from the source are directed with fan angles in the x'z' plane $FA_i$ and beam projection angles in the x'y' plane $BA_j$. Multiple receive beams intersecting a fan do not need to be equally spaced along the fan, nor do fans need to be evenly distributed fore and aft. There is no requirement to use a fan at nadir, although in an embodiment where three fans cover a 40 degree arc in the x'z' plane, fan angles measured from the z' axis in the x'z' plane are −20, 0 and +20 degrees.

Figure 4D:
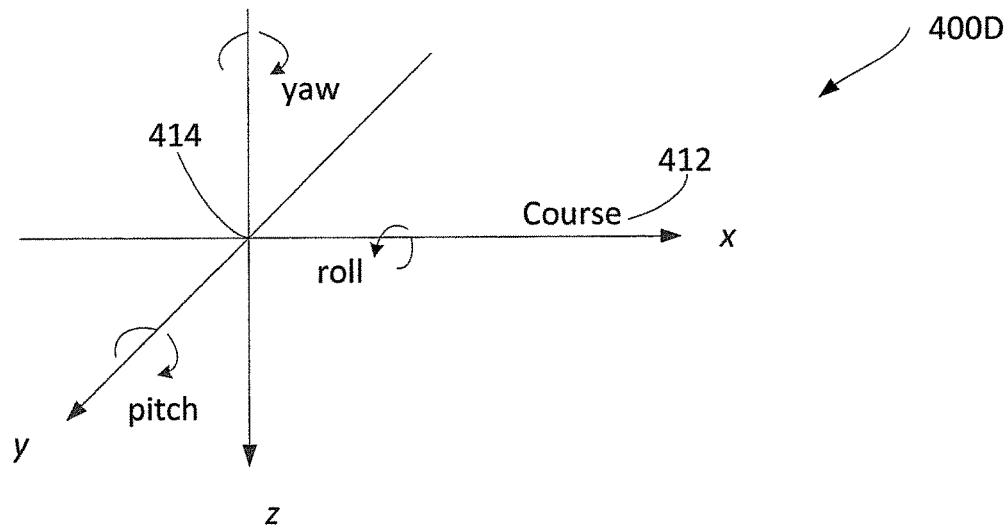
Figure 4E:
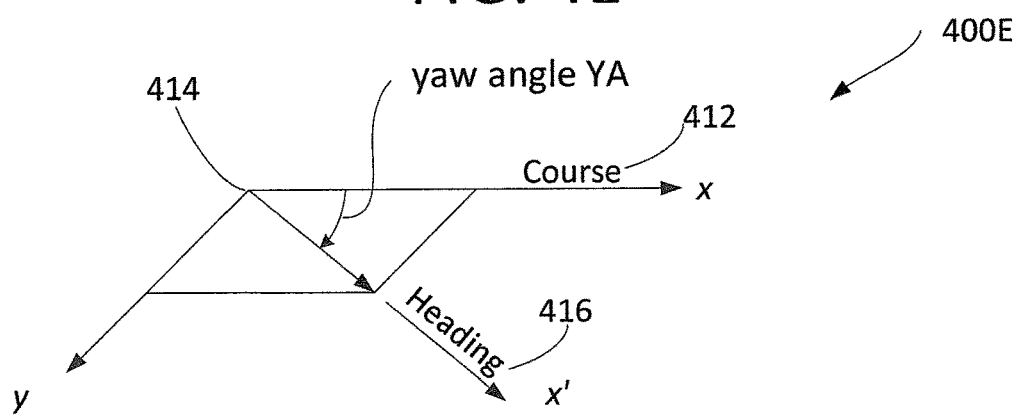
Figure 4F:
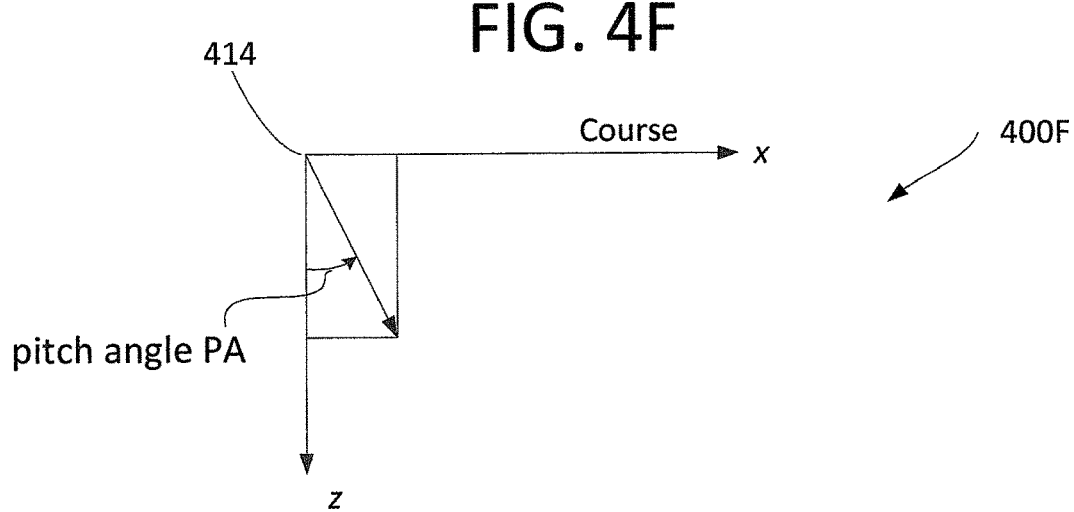

FIGS. 4D-F show a course coordinate system 400D-F. This course coordinate system is centered on the source 414 and is described by orthogonal axes x, y, z. As seen in FIG. 4D, motion of the source may include one or more of rolling about the x axis, pitching about the y axis, and yawing about the z axis.

In FIG. 4E, a yaw angle YA describes the angular offset measured in the xy plane. The yaw angle, also commonly referred to as crab angle, is the angle between the course direction along the x axis and the heading direction along the x' axis. Here, the x axis lies along the line that is the course or instantaneous course of the boat 412. As skilled artisans will appreciate, in the absence of external forces on the boat, the course and heading may not differ. However, when an external force, e.g., wind, waves, or current, acts on the boat, the heading will be offset from the course to compensate for the forces which tend to move the boat off course.

In FIG. 4F, a pitch angle PA describes an angular offset measured in the xz plane. The pitch angle is measured from the z axis and indicates the pitch of the boat. Notably, the location of a fan on a waterbody bottom varies with fan angle FA setting and with boat pitch angle PA.

As mentioned above, a multiplicity of Doppler velocities such as a multiplicity of Doppler radial velocities $DRV_{i,j}$ may be used to estimate and/or determine a relative velocity $V_{source}$ between an MBES source and a reflector. Notably, the reflector may be a waterbody bottom, scattering centers entrained in the water column such as bubbles or particulate, and reflectors otherwise located in the water column. Notably, where the MBES is mounted on a vessel for DVL bottom tracking, $V_{source}$ is a source velocity relative to a stationary waterbody bottom target. Where the MBES is mounted on a vessel for DVL water tracking, $V_{source}$ is a source velocity relative to a water layer that may be moving in the water column. And, where the MBES is mounted on a vessel or waterbody bottom for ADCP water column measurements, $V_{source}$ is water column target velocity relative to a MBES. Notably, the vessel may be moving or stationary.

FIGS. 4G-I show exemplary equations 400G-I to solve for $V_{source}$ using a plurality of Doppler radial velocities, each Doppler radial velocity being indicative of $V_{source}$. Notably, applicants have found that such estimates of $V_{source}$ may be more accurate than estimates based on a single or only a few beams and/or may be more accurate than estimates based on returns from a single or only a few waterbody bottom or water column locations.

Determination of $DRV_{i,j}$ may utilize the pulse-pair method, an efficient computational algorithm known to skilled artisans, to process data from each of j beams on each of i fans individually (See e.g. U.S. Pat. No. 5,483,499). A complex representation (angle and magnitude) of the autocorrelation of beam data at a time lag equal to one pulse length T is calculated for all range cells k, one of which is selected, depending on the operating mode of the MBES, to provide angle information $CSANGLE_{i,j}$ to the calculation of $DRV_{i,j}$ as follows:

$$DRV_{i,j} = CSANGLE_{i,j} * (c/(2*pi*f_c*T))$$

where c=speed of sound (m/s)=

$f_c$ center frequency of transmitted pulse (Hz)

T=pulse length (s)

As seen, Doppler radial velocity $DRV_{i,j}$ varies with fan i and beam j, and there are a total of (i*j) DRV estimates. In various embodiments, all of these DRV estimates contribute to an estimate of $V_{source}$. And, in various embodiments only selected ones of these DRV estimates contribute to an estimate of $V_{source}$. For example, in a beam skipping embodiment, pairs of selected receive beams intersecting a particular fan may be separated by an integer quantity of p beams that are not selected such that where p=2, beams 1, 4, 7 . . . are selected and beams 2, 3, 5, 6 are not selected. For example, in a first reduced beam count embodiment a source velocity is estimated using a quantity r1<(i*j) of the $DRV_{i,j}$ estimates and r1 is determined in part by the processing capacity of a digital processing section of the receiver. For example, in a second reduced beam count embodiment, the value of r1 is automatically determined by the acoustic Doppler system as a function of equipment variables, environmental variables, and/or mission requirements.

The quantity $V_{source}$ is estimated via minimization of a cost equation 400H such as the cost equation of FIG. 4H. FIG. 4I shows cost equation variables 400I that are knowns $DRV_{i,j}$, $BA_j$, $FA_i$ and cost equation variables that are unknown $V_{source}$, YA, and PA. As skilled artisans will appreciate, the hypothesized and/or estimated values for the unknowns $V_{source}$, YA, and PA that minimize cost and/or result in the smallest cost are declared the best estimates for those values, together describing a source velocity vector in polar coordinates. Cost equation minimization methods include brute force searches, Nelder-Mead type methods, Newton's method, and other suitable minimization methods known to skilled artisans.

Summed for a plurality of beams j in each of a plurality of fans i, the cost equation is $$Cost = \sum_{i=1}^{fans} \sum_{j=1}^{beams} (kx1 * V_{source} * D - DRV_{i,j})^2$$

where: D=Cos (YA−BA)*Cos (PA−$FA_i$)

kx1=2 for DVL mode kx1=1 for ADCP mode $V_{source}$=Relative velocity between MBES and reflector/scatterer Notably, constant kx1 recognizes that for typical DVL modes the source is in motion and therefore its echo is Doppler shifted twice, once on transmit and once on receive. Hence the value kx1=2 for DVL mode and kx1=1 for ADCP mode.

Exemplary DVL Process

FIG. 4J shows a flowchart 400J of an exemplary DVL process using pulse pairs to determine source velocity. Here, a source for emitting an acoustic message with consecutive components is provided 482. The source, such as a vessel mounted source 405, may be subjected to pitch PA and yaw YA while moving along a course 484. As skilled artisans will appreciate, a source heading may differ from the course by a yaw angle YA 486.

As the source moves along the course, it ensonifies multiple fans F 1 at fan angles $FA_i$. Then, returns from each of the fans are received on j receive beams per fan for a total of (i*j) beams $B_{i,j}$ at beam angles $BA_{i,j}$ 488, are time gated, and are associated with k range cells per beam for a total of (i*j*k) range cells $RC_{i,j,k}$ 490. See for example the multi-beam echo sounder systems of FIGS. 1B-F.

In a step 492 that follows, application of the pulse-pair method provides a complex autocorrelation value with an angle $CSANGLE_{i,j,k}$ and magnitude $CSMAG_{i,j,k}$ for each range cell $RC_{i,j,k}$ (see. e.g., U.S. Pat. No. 5,483,499).

In a step 494 that follows, the range cell in each beam that corresponds to the waterbody bottom is determined. For example, the maximum correlation magnitude $CSMAG_{i,j,k}$ in each beam may be used to identify a waterbody bottom range cell $WBBRC_{i,j}$ in each beam.

In a step 496 that follows, Doppler radial velocities are calculated for each range cell corresponding to the waterbody bottom. For example, $CSANGLE_{i,j,k}$ may be used to calculate Doppler radial velocity $DRV_{i,j}$ for each $WBBRC_{i,j}$.

In a step 498 that follows, source velocity is estimated. For example, the cost equation mentioned above, with kx1=2 for DVL mode, may be minimized to estimate unknowns $V_{source}$, YA, and PA given knowns $DRV_{i,j}$ $BA_j$, and $FA_i$.

Exemplary ADCP Process

Figure 4K:
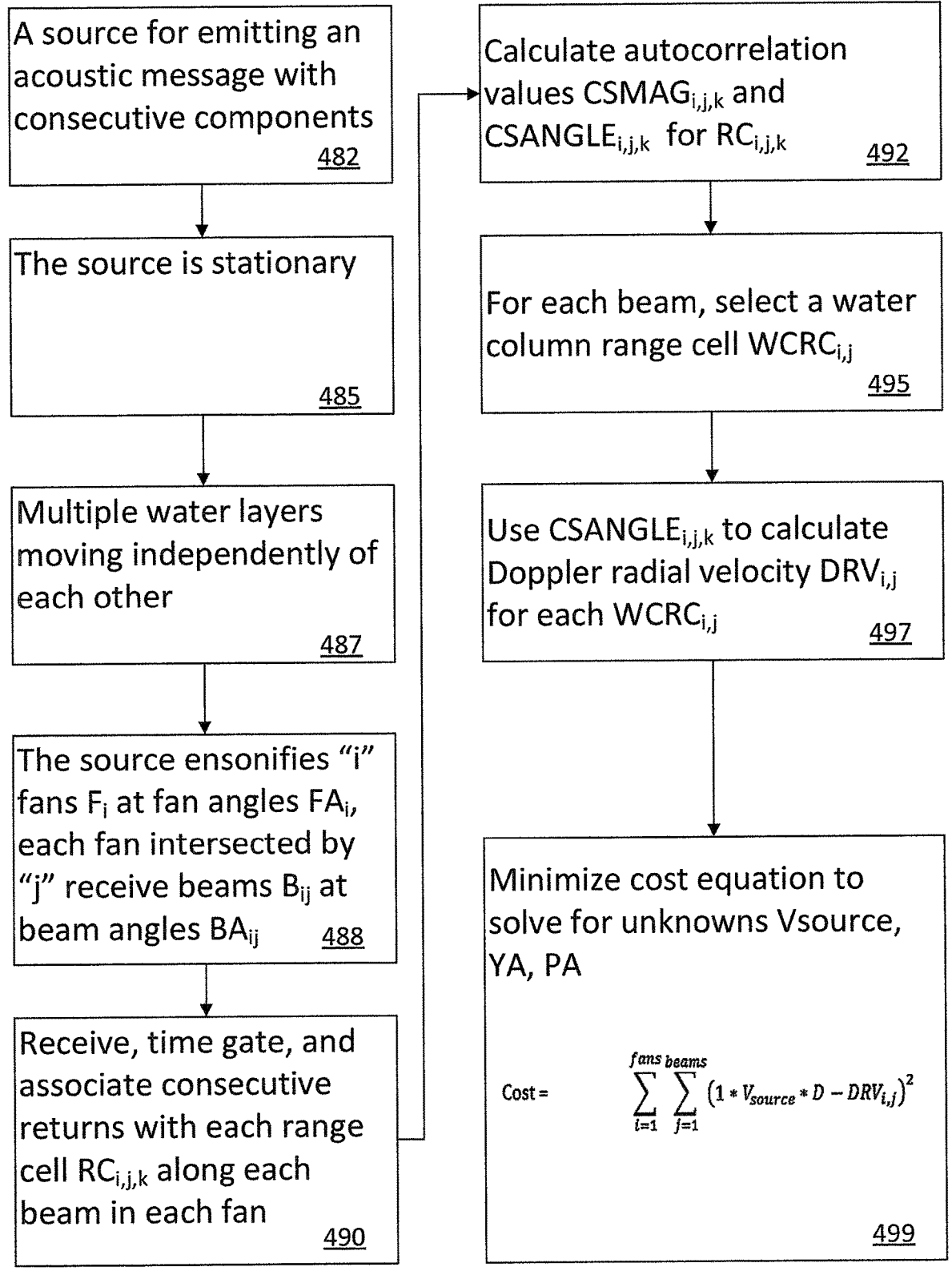
FIG. 4K shows velocity calculations and methods for use with multibeam echo sounder systems similar to that of FIG. 1A where the operating mode is an Acoustic Doppler Current Profiler ("ADCP") mode.

FIG. 4K shows a flowchart 400K of an exemplary ADCP process using pulse pairs to determine flow velocity. Here, a source for emitting an acoustic message with consecutive components is provided 482. The source is considered stationary 485, such as one mounted on the sea floor or to a non-moving vessel. Water layers above or below the source, respectively, may be in motion relative to the source, and each layer may have a velocity independent of the other layers 487. The source ensonifies multiple zones creating fans $F_i$ at fan angles $FA_i$. Then, returns from each of the fans are received on j receive beams per fan for a total of (i*j) beams $B_{i,j}$ at beam angles $BA_{i,j}$ 488, are time gated, and are associated with k range cells per beam for a total of (i*j*k) range cells $RC_{i,j,k}$ 490. See for example the multibeam echo sounder systems of FIGS. 1B-F.

In a step 492 that follows, application of the pulse pair method provides a complex autocorrelation value with an angle $CSANGLE_{i,j,k}$ and magnitude $CSMAG_{i,j,k}$ for each range cell $RC_{i,j,k}$. In a step 495 that follows, for each beam a water column range cell at a depth of interest $WCRC_{i,j}$ is selected. These range cells likely capture part of the water column or a water volume instead of the waterbody bottom. Further, although only one depth of interest may be indicated, the process can be repeated for numerous depths to collectively form a vertical profile of velocity estimates and/or an average velocity estimate.

In a step 497 that follows, Doppler radial velocities $DRV_{i,j}$ are calculated for each range cell corresponding to the depth of interest. For example, $CSANGLE_{i,j,k}$ may be used to calculate $DRV_{i,j}$ for each $WCRC_{i,j}$.

In a step 499 that follows, source velocity is estimated. For example, the cost equation mentioned above, with kx1=1 for ADCP mode, may be minimized to estimate unknowns $V_{source}$, YA, and PA given knowns $DRV_{i,j}$ $BA_j$, and $FA_i$.

FIGS. 5A-F below show exemplary message constructs 500A-F. One or more of these message constructs may be propagated through a liquid medium to generate returns from one or more fans to estimate a velocity of the sonar system sending the message and/or the velocity of a vessel that carries the sonar system.

Figure 5A:
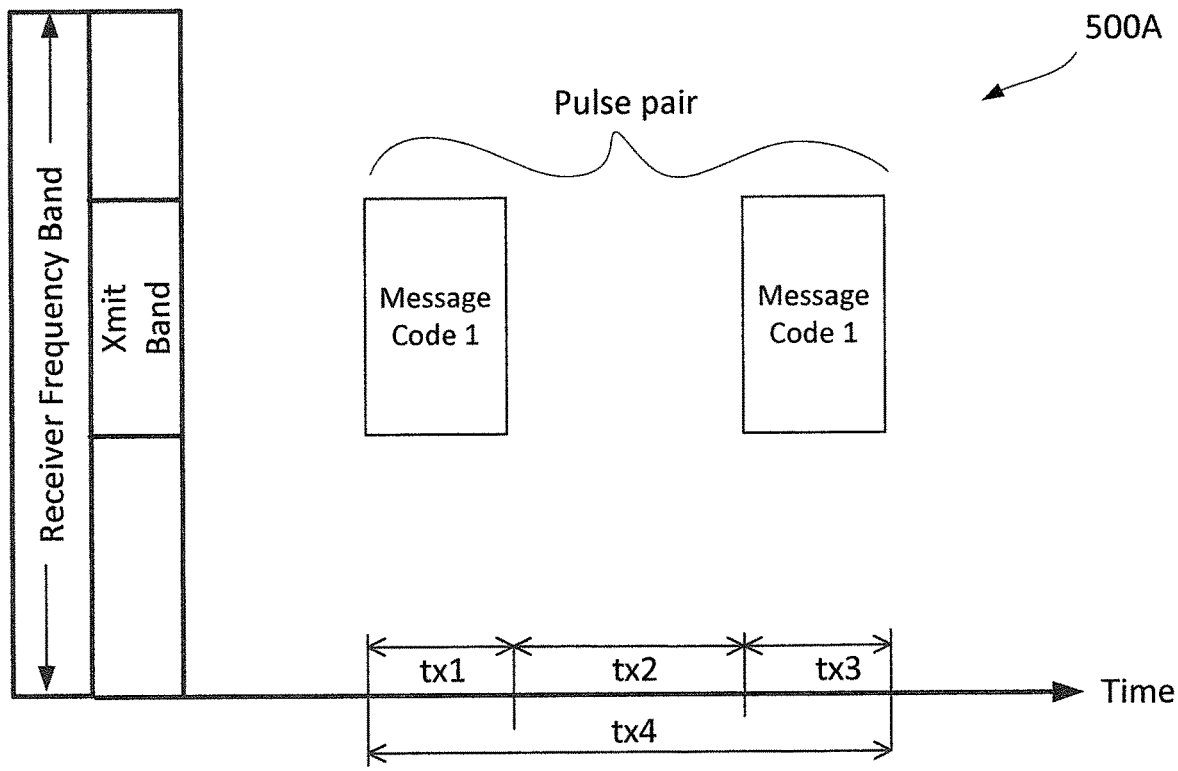

FIG. 5A shows a single fan message including a pulse pair 500A. A first message component includes message code 1 transmitted during a timespan tx1 and a second message component includes the same message code 1 transmitted during a timespan tx3. These two timespans and similar timespans discussed below may be separated by a timespan tx2 or they may be contiguous such that tx2=0. The timespan between the beginning of the first message component and the end of the second message component is tx4. In various embodiments, pulses in one or more pulse pairs do not overlap in time.

As shown, the message components may be sent using a particular transmitter frequency band. This transmitter frequency band may be less than (as shown) or substantially equal to an available frequency band of a multibeam echo sounder transmitter 150 and/or a multibeam echo sounder receiver 170.

Figure 5B:
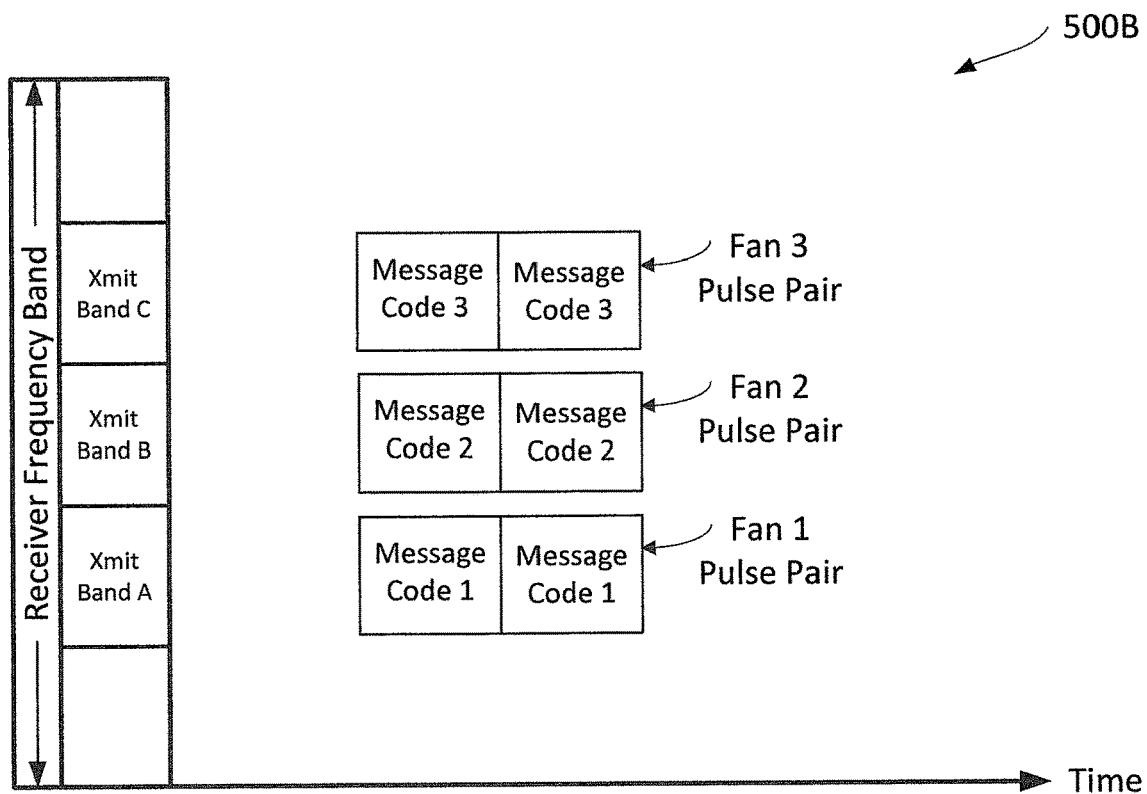

FIG. 5B shows a multi-fan message including three pulse pairs for ensonifying three fans simultaneously or substantially simultaneously 500B. Here, the message includes pulse pairs transmitted in parallel and serially transmitted pulses within the each pulse pair. The message may therefore be referred to as a serial-parallel message or a serial-parallel message using single pulse pairs insofar as the pulses of the pulse pairs are transmitted serially and the fans are ensonified simultaneously.

For a first fan (Fan 1), message components include message code 1 and message code 1 transmitted serially in a first receiver frequency band A. For a second fan (Fan 2), message components include message code 2 and message code 2 transmitted serially in a second receiver frequency band B. For a third fan (Fan 3), message components include message code 3 and message code 3 transmitted serially in a third receiver frequency band C.

In some embodiments, message codes 1, 2, 3 of the first message component for each of the fans are transmitted simultaneously in each of three non-overlapping and/or contiguous receiver frequency bands. And, in some embodiments message codes 1, 2, 3 of the second message component for each of the fans are transmitted simultaneously in each of the three non-overlapping and/or contiguous receiver frequency bands.

Figure 5C:
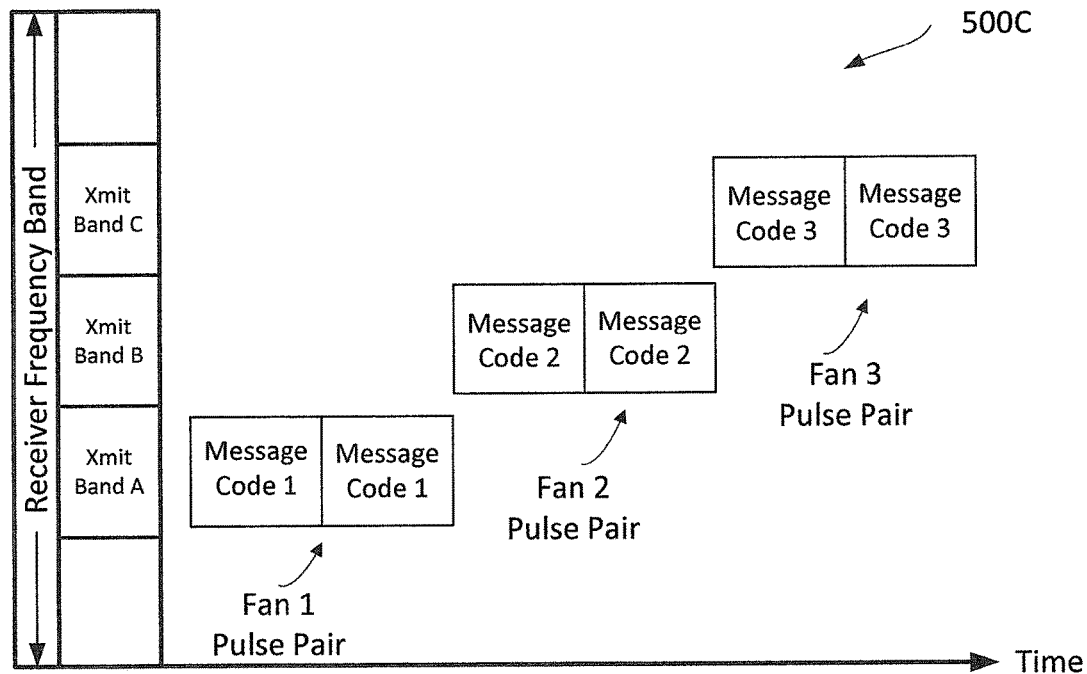

FIG. 5C shows a multi-fan message including three pulse pairs for ensonifying three fans in sequence 500C. Here, the message includes serially transmitted pulse pairs and serially transmitted pulses within the each pulse pair. The message may therefore be referred to as a serial-serial message using single pulse pairs insofar as the pulses of pulse pairs are transmitted serially and the fans are ensonified serially.

Skilled artisans will recognize serial messages may increase the strength of the signal ensonifying each fan because transmitter signal strength is not shared among fans as may happen with messages having components transmitted in parallel.

For a first fan, message components include message code 1 and message code 1 transmitted serially in a first receiver frequency band A. For a second fan, message components include message code 2 and message code 2 transmitted serially in a second receiver frequency band B. For a third fan, message components include message code 3 and message code 3 transmitted serially in a third receiver frequency band C.

As seen, each of the fans is ensonified in sequence as a fan 1 pulse pair transmitted in band A is followed by a fan 2 pulse pair transmitted in band B which is followed by a fan 3 pulse pair transmitted in band C. In various embodiments, the fan ensonifying messages do not overlap and in various embodiments the fan ensonifying messages are contiguous. The transmission frequency bands may be non-overlapping and/or contiguous receiver frequency bands. The messages may be transmit in one or more message cycles.

Disambiguation

Where a single pulse pair is used in each frequency band as shown in FIG. 5B, source velocity accuracy and/or ambiguity issues may arise. For example, it is known that longer pulses can provide greater accuracy when using e.g. pulse pair correlation methods. However, longer pulses may result in ambiguous source velocity estimates because longer pulses may experience phase shifts exceeding a full 2 pi rotation. This phase wrapping ambiguity may result in erroneous source velocity estimates.

As seen below, both short and long pulse pairs in each frequency band may be used to resolve ambiguous long pulse measurements. Here, a short pulse pair provides an initial estimate within 2 pi of the long pair phase shift, and this initial estimate is used to resolve any ambiguity in a corresponding long pulse-pair estimate.

Figure 5D:
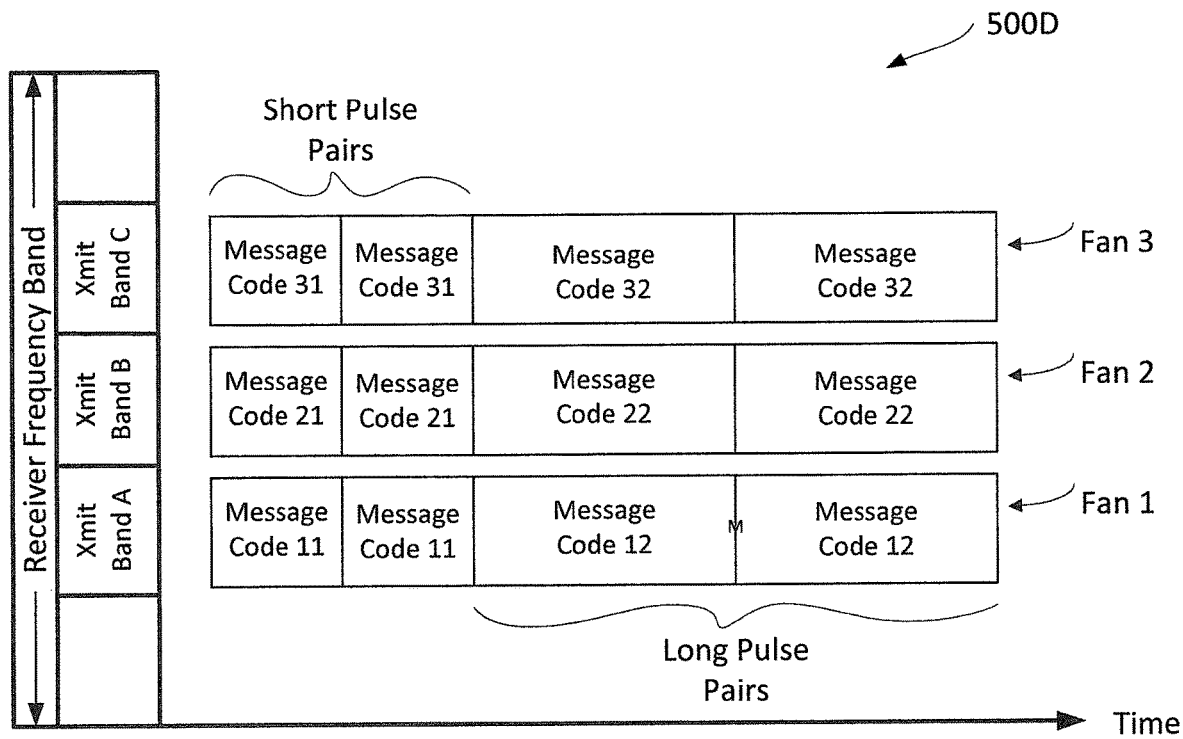

In FIG. 5D, a multifan message utilizes dual pulse pairs transmitted in parallel 500D. In particular, for each of n=3 fans, a dual pulse message is used to ensonify the fan such that 2n=6 pulses are transmitted in the message. Here, the 3 dual pulse pairs are transmitted simultaneously while the message components within each dual pulse pair are transmitted serially. The message may therefore be referred to as a serial-parallel message or a dual pulse pair serial-parallel message insofar as the pulses of the dual pulse pairs are transmitted serially and the fans are ensonified simultaneously.

For a first fan, message components for a short pulse pair include message code 11 and message code 11 while message components for a long pulse pair include message code 12 and message code 12. As such, the first fan may be ensonified by a short pulse pair and a long pulse pair. These pulse pairs may be transmitted in band A.

For a second fan, message components for a short pulse pair include message code 21 and message code 21 while message components for a long pulse pair include message code 22 and message code 22. As such, the second fan may be ensonified by a short pulse pair and a long pulse pair. These pulse pairs may be transmitted in band B which may or may not be contiguous with band A.

For a third fan, message components for a short pulse pair include message code 31 and message code 31 while message components for a long pulse pair include message code 32 and message code 32. As such, the third fan may be ensonified by a short pulse pair and a long pulse pair. These pulse pairs may be transmitted in band C which may or may not be contiguous with band B.

As seen, there are n fans and 2n pulse pairs including i) n short pulse pairs, each pair including first and second message components and ii) n long pulse pairs, each pair including third and fourth message components.

In some embodiments, short pulse message codes 11, 21, 31 of the first message component for each of the fans are transmitted simultaneously in each of three non-overlapping and/or contiguous receiver frequency bands. And, in some embodiments, short pulse message codes 11, 21, 31 of the second message component for each of the fans are transmitted simultaneously in each of the three non-overlapping and/or contiguous receiver frequency bands. In some embodiments, long pulse message codes 12, 22, 32 of the third message component for each of the fans are transmitted simultaneously in each of three non-overlapping and/or contiguous receiver frequency bands. And in some embodiments, long pulse message codes 12, 22, 32 of the fourth message component for each of the fans are transmitted simultaneously in each of the three non-overlapping and/or contiguous receiver frequency bands.

In FIG. 5D and in FIG. 5E below, embodiments include those where i) message codes 11, 21, 31 are g bit codes and each bit is u samples long and message codes 12, 22, 32 are g bit codes and each bit is an integer multiple of u samples long, for example 4u samples long. For example, when u=1 and where 13-bit Barker codes are used with no time delay between codes, 130 samples (13+13+52+52) at a sample rate of 68,400 Hz results in a message that is 1.9 milliseconds long.

Applicant notes this and other examples may suggest use of a limited number of fans, for example three fans. However, no such limitation is intended. Rather, survey system hardware 100B may support larger fan arrays such as arrays of 5, 7, 10, 20, 40, or more fans.

While various codes known to skilled artisans might be used in constructing message components, the inventor's experience suggest that Barker codes and Orthogonal Spread Spectrum ("OSS") codes are suitable alternatives in many applications of interest.

Figure 5E:
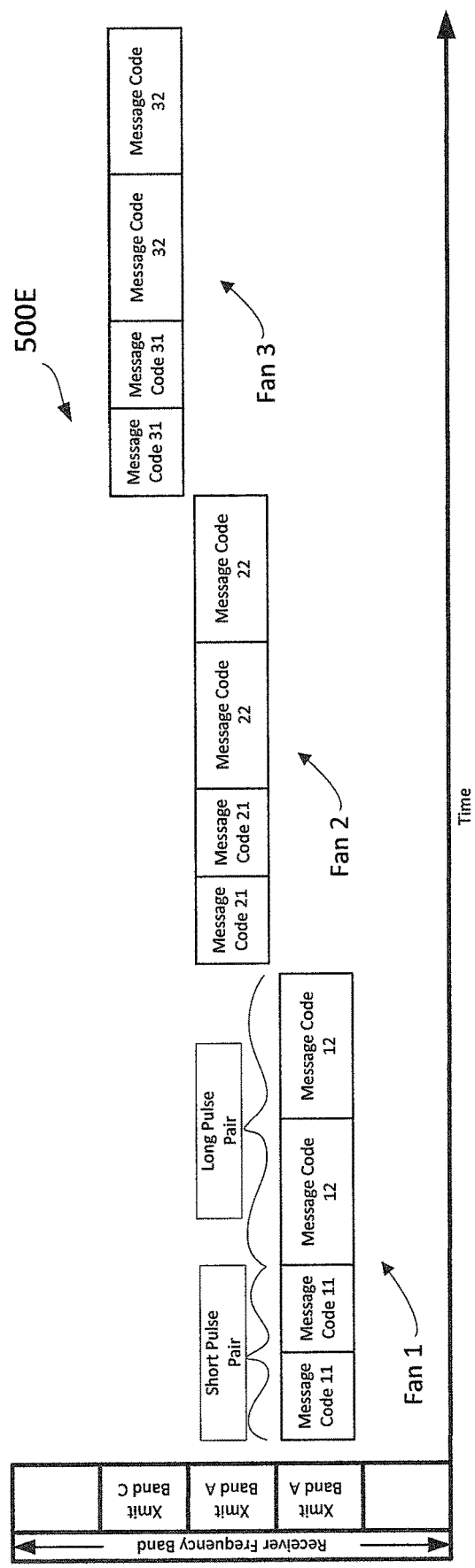

In FIG. 5E, a multifan message utilizes dual pulse pairs 500E transmitted in sequence. In particular, for each of n=3 fans, a dual pulse message is used to ensonify the fan such that 2n=6 pulses are transmitted in the message. Here, the 3 dual pulse pairs are transmitted sequentially and the message components within each dual pulse pair are transmitted serially. The message may therefore be referred to as a serial-serial message or a dual pulse pair serial message insofar as the pulses of dual pulse pairs are transmitted serially and the fans are ensonified serially.

For a first fan, message components for a short pulse pair include message code 11 and message code 11 while message components for a long pulse pair include message code 12 and message code 12. As such, the first fan may be ensonified by a short pulse pair and a long pulse pair. These pulse pairs may be transmitted in band A.

For a second fan, message components for a short pulse pair include message code 21 and message code 21 while message components for a long pulse pair include message code 22 and message code 22. As such, the second fan may be ensonified by a short pulse pair and a long pulse pair. These pulse pairs may be transmitted in band B which may or may not be contiguous with band A.

For a third fan, message components for a short pulse pair include message code 31 and message code 31 while message components for a long pulse pair include message code 32 and message code 32. As such, the third fan may be ensonified by a short pulse pair and a long pulse pair. These pulse pairs may be transmitted in band C which may or may not be contiguous with band B.

As seen, there are n fans and 2n pulse pairs including n short pulse pairs and n long pulse pairs.

As seen, each of the fans is ensonified in sequence as a fan 1 dual pulse pair transmitted in band A is followed by a fan 2 dual pulse pair transmitted in band B which is followed by a fan 3 dual pulse pair transmitted in band C. In various embodiments, the fan ensonifying messages do not overlap and in various embodiments the fan ensonifying messages are contiguous. The transmission frequency bands may be non-overlapping and/or contiguous receiver frequency bands. The message may be transmit in one or more message cycles.

In some embodiments, Barker codes with lengths of one or more of 2, 3, 4, 5, 7, 11, and 13 bits are used to construct single pulse pair X-X messages and/or dual pulse pair messages X-X, Y-Y.

For example, where each of qty. xb bits in message code X are expressed with xs samples and each of qty. yb bits in message code Y are expressed with ys samples, an exemplary short message code X might be an xb=11 bit Barker code with xs=1 sample per bit while a long message code Y might be the same code with yb=11 and a greater number of samples ys=4 samples per bit. Note that in a dual pulse pair message X-X, Y-Y codes, the code in message code X may differ from the code in message code Y and the number of samples used to express each bit in message code X may differ from the number of samples used to express each bit in message code Y.

Yet another message may include short message code X using, for example, a 7 bit Barker code and a long message code Y using, for example, a 13 bit Barker code. In various embodiments, the number of samples used to express bits in message code X may be the same or different from the number of samples used to express bits in the message code Y so long as $(xs*xb)<(ys*yb)$. In some embodiments, $(xs*xb)>(ys*yb)$.

In some embodiments, the pulses of pulse pairs may be ordered such that short pulse pairs are transmitted first or such that long pulse pairs are transmitted first. In some embodiments pulses used to construct a pulse pair may be transmitted as concatenated pulses or transmitted with a time delay therebetween to the extent that the velocity estimates remain substantially concurrent in time.

FIG. 5F shows various code selections for use in a three fan Doppler velocity measurement 500F. For each of the fans, the message includes a short code pulse pair and a long code pulse pair.

Here, fan 1 message components include a Barker Code short pulse pair (Barker Code 11, Barker Code 11) and a Barker Code long pulse pair (Barker Code 12, Barker Code 12) in frequency band A. Fan 2 message components include a Barker Code short pulse pair (Barker Code 21, Barker Code 21) and a Barker Code long pulse pair (Barker Code 22, Barker Code 22) in frequency band B. Fan 3 message components include a Barker Code short pulse pair (Barker Code 31, Barker Code 31) and a Barker Code long pulse pair (Barker Code 32, Barker Code 32) in frequency band C.

Frequency bands A, B, C may be non-overlapping and/or contiguous. In some embodiments, for each fan, the short and long pulse pairs are contiguous. In some embodiments, these pulse pairs are not contiguous.

As skilled artisans will appreciate, when a particular fan (e.g., 1, 2, 3) and pulse-pair type (e.g., 1:short, 2:long) uses a particular Barker code (e.g., Barker Code (fan, type) =Barker Code 11 for fan 1, type 1), signals returned from a particular fan may be distinguished by frequency while in-band signals (e.g., short pulse pair [Barker Code 1, Barker Code 1] and long pulse pair [Barker Code 4, Barker Code 4]) may be temporally non-overlapping and/or temporally separated.

In an embodiment, Orthogonal Spread Spectrum ("OSS") codes are used. Here, an exemplary short message code might be an OSS code n samples long while a long message code might be an OSS code that is greater than n samples long.

Here fan 1 message components include an OSS short pulse pair (OSS Code 11, OSS Code 11) and an OSS long pulse pair (OSS Code 12, OSS Code 12) in frequency band A. Fan 2 message components include an OSS short pulse pair (OSS Code 21, OSS Code 21) and an OSS long pulse pair OSS Code 22, OSS Code 22) in frequency band B. Fan 3 message components include an OSS short pulse pair (OSS Code 31, OSS Code 31) and an OSS long pulse pair (OSS Code 32, OSS Code 32) in frequency band C.

In some embodiments, for each fan, the short and long pulse pairs are contiguous. In some embodiments, these pulse pairs are not contiguous.

As skilled artisans will appreciate, when a particular fan (e.g., 1, 2, 3) and pulse pair type (e.g., 1:short, 2:long) uses a particular OSS code (e.g., OSS Code (fan, type)=OSS Code 11 for fan 1, type 1), signals returned from a particular fan may be distinguished by frequency. In various embodiments in-band signals (e.g., short pulse pair [Code X, Code X] and long pulse pair [Code Y, Code Y]) may be temporally non-overlapping and/or temporally separated.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A system for estimating water current flows, the system comprising:
   a stationary multibeam echo sounder in a water column;
   an acoustic transceiver of the echo sounder configured to communicate with a) plural transducers in one projector array and b) plural transducers in one hydrophone array;
   the acoustic transceiver synthesizes one transmitter message and excites the projector array with the transmitter message such that multiple fans ensonify the water column;
   the transmitter message includes at least one pulse pair for each fan; and,
   the acoustic transceiver and hydrophone array form multiple hydrophone array receive beams and a plurality of hydrophone array receive beams intersect each fan;
   wherein the hydrophone array receives transmitter message echoes from scattering centers entrained in the water column.

2. The system of claim 1 wherein message echoes are time-gated to associate with range cells along each beam of the fan.

3. The system of claim 2 wherein a receiver processes associated return signals via autocorrelation of pulse pairs to calculate a radial velocity for each range cell of each beam of each fan.

4. The system of claim 1 wherein there are i fans and j>=8 beams, echoes being processed via auto correlation of pulse pairs to calculate for each of (i*j) beams respective Doppler radial velocity estimates $DRV_{i,j}$.

5. The system of claim 4 wherein evaluation of a plurality of the $DRV_{i,j}$ estimates provides an estimated source velocity.

6. The system of claim 4 wherein simultaneous evaluation of a plurality of the $DRV_{i,j}$ estimates provides an estimated source velocity.

7. The system of claim 1 wherein:
   for each fan, ensonifying pulses are transmitted in a respective frequency band as pulses without temporal overlap; and,
   the receiver for matching returns with fans based at least in part on frequencies of the returns.

8. The system of claim 7 exclusive of matched filtering.

9. The system of claim 8 wherein each pulse uses a Barker code.

10. The system of claim 1 wherein the message includes i) a pulse pair X-X where pulse X is an xb bit code with xs samples per bit and ii) a pulse pair Y-Y where pulse Y is a yb bit code with ys samples per bit.

11. The system of claim 10 wherein:
    for each fan, ensonifying pulses are transmitted in a respective frequency band as serialized pulses without temporal overlap; and,
    the receiver determines which returns come from which fans based at least in part on the frequencies of the returns.

12. The system of claim 11 wherein pulse X is a short pulse with a transmission time timex and pulse Y is a long pulse with a transmission time timey>timex.

13. The system of claim 12 wherein (ys*yb)>(xs*xb).

14. The system of claim 1 wherein relative velocity is estimated using a cost minimization equation.

15. The system of claim 1 wherein the projector array and the hydrophone array are linear arrays.

16. The system of claim 1 wherein the message is a serial-parallel message for simultaneously ensonifying the fans.

17. The system of claim 1 wherein the fans are ensonified simultaneously and separable via frequency band.

18. The system of claim 1 wherein the message is a serial-serial message for sequentially ensonifying each of the fans.

* * * * *